United States Patent
Destraves et al.

(10) Patent No.: US 11,981,166 B2
(45) Date of Patent: *May 14, 2024

(54) TIRE COMPRISING A RADIOFREQUENCY TRANSPONDER

(71) Applicant: COMPAGNIE GENERALE DES ETABLISSEMENTS MICHELIN, Clermont-Ferrand (FR)

(72) Inventors: Julien Destraves, Clermont-Ferrand (FR); Laurent Couturier, Clermont-Ferrand (FR); Pierre Guinault, Clermont-Ferrand (FR); Emmanuel Joulin, Clermont-Ferrand (FR); Sebastien Fredon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 117 days.

This patent is subject to a terminal disclaimer.

(21) Appl. No.: 17/763,378

(22) PCT Filed: Sep. 22, 2020

(86) PCT No.: PCT/FR2020/051651
§ 371 (c)(1),
(2) Date: Mar. 24, 2022

(87) PCT Pub. No.: WO2021/058905
PCT Pub. Date: Apr. 1, 2021

(65) Prior Publication Data
US 2022/0371386 A1    Nov. 24, 2022

(30) Foreign Application Priority Data
Sep. 25, 2019  (FR) ...................................... 1910573

(51) Int. Cl.
*B60C 23/04* (2006.01)
*B60C 15/06* (2006.01)
(Continued)

(52) U.S. Cl.
CPC ...... *B60C 23/0452* (2013.01); *B60C 15/0628* (2013.01); *B60C 17/0018* (2013.01);
(Continued)

(58) Field of Classification Search
CPC ............ B60C 23/0452; B60C 15/0628; B60C 17/0018; B60C 23/0493;
(Continued)

(56) References Cited

U.S. PATENT DOCUMENTS 6,112,102 A    8/2000  Zhinong
9,496,618 B2   11/2016  Robert et al.
(Continued)

FOREIGN PATENT DOCUMENTS

CN    110072713 A    7/2019
EP    0929912 A1     7/1999
(Continued)

OTHER PUBLICATIONS

International Search Report dated Dec. 1, 2020, in corresponding PCT/FR2020/051651 (6 pages).

*Primary Examiner* — John A Tweel, Jr.
(74) *Attorney, Agent, or Firm* — VENABLE LLP

(57) ABSTRACT

A tire fitted with a transponder comprises: a crown comprising a crown reinforcement having an axial end at each of its edges, connected at each of its axial ends by a sidewall to a bead having an interior end; a carcass reinforcement layer formed of parallel reinforcers, which is anchored in each bead around a bead wire to form a main part and a turn-up; and the transponder comprising a dipole antenna consisting of a spring defined by a pitch P and a diameter D.

(Continued)

A ratio between the pitch (P1) and the diameter (D1) for a loop of a first region of the spring is greater than 0.8, and the transponder is situated axially on the outside of an interior end of the bead and radially between the upper end of the bead wire and the axial end of the crown reinforcement.

15 Claims, 9 Drawing Sheets

(51) Int. Cl.
    *B60C 17/00* (2006.01)
    *H01Q 1/22* (2006.01)
    *H01Q 9/28* (2006.01)
(52) U.S. Cl.
    CPC ....... *B60C 23/0493* (2013.01); *H01Q 1/2241* (2013.01); *H01Q 9/285* (2013.01); *B60C 2015/0621* (2013.01); *B60C 2017/0063* (2013.01); *B60C 2017/0081* (2013.01)
(58) Field of Classification Search
    CPC .... B60C 2015/0621; B60C 2017/0063; B60C 2017/0081; H01Q 1/2241; H01Q 9/285
    See application file for complete search history.

(56) References Cited

U.S. PATENT DOCUMENTS

| | | | |
|---|---|---|---|
| 10,339,435 | B2 | 7/2019 | Destraves |
| 10,974,553 | B2 | 4/2021 | Destraves et al. |
| 11,018,406 | B2 | 5/2021 | Destraves et al. |
| 11,152,684 | B2 | 10/2021 | Destraves et al. |
| 11,264,698 | B2* | 3/2022 | Destraves ................ H04B 1/59 |
| 11,295,193 | B2* | 4/2022 | Destraves .............. H01Q 1/362 |
| 11,505,011 | B2 | 11/2022 | Lallement et al. |
| 11,548,331 | B2* | 1/2023 | Destraves ........... B60C 23/0452 |
| 2013/0185929 | A1 | 7/2013 | Robert et al. |
| 2018/0174015 | A1 | 6/2018 | Destraves |
| 2019/0322142 | A1 | 10/2019 | Allement et al. |
| 2020/0079159 | A1 | 3/2020 | Destraves et al. |
| 2022/0339976 | A1* | 10/2022 | Destraves ........ G06K 19/07764 |
| 2022/0348043 | A1* | 11/2022 | Destraves ........ G06K 19/07764 |

FOREIGN PATENT DOCUMENTS

| | | |
|---|---|---|
| EP | 2603887 A1 | 6/2013 |
| WO | 2016/193457 A1 | 12/2016 |
| WO | 2018/104620 A1 | 6/2018 |
| WO | 2018/104623 A1 | 6/2018 |
| WO | 2018/224194 A1 | 12/2018 |

* cited by examiner

TIRE COMPRISING A RADIOFREQUENCY TRANSPONDER

FIELD OF THE INVENTION

The present invention relates to a tyre casing fitted with an electronic radio identification device or radiofrequency transponder which, particularly in service when mounted on a land vehicle, is subjected to severe thermomechanical stresses.

TECHNOLOGICAL BACKGROUND

In the field of RFID devices (RFID being the acronym of RadioFrequency IDentification), passive radiofrequency transponders are conventionally used to identify, track and manage objects. These devices allow more reliable and faster automated management.

These passive radiofrequency-identification transponders generally consist of at least one electronic chip and one antenna formed by a magnetic loop or a radiating antenna, which is fastened to the object to be identified.

The communication performance of the radiofrequency transponder is expressed in terms of the maximum distance of communication of the radiofrequency transponder with a radiofrequency reader, for a given signal communicated to or by the radiofrequency reader.

In the case of highly extensible products such as, for example, tyres, there is a need to identify the product throughout its life from its manufacture to its removal from the market and, in particular, during use thereof. Thus, in order to facilitate this task, in particular under the conditions of use on a vehicle, a high communication performance is required, which is expressed in terms of the ability to interrogate the radiofrequency transponder at a large distance (several metres) from the product, via a radiofrequency reader. Lastly, it is desired for the manufacturing cost of such a device to be as competitive as possible.

A passive radiofrequency-identification transponder able to meet the needs of tyres is known in the prior art, and in particular from document WO 2016/193457A1. This transponder consists of an electronic chip, connected to a printed circuit board to which is galvanically connected a first primary antenna. This primary antenna is electromagnetically coupled to a single-strand helical spring that forms a radiating dipole antenna. The communication with an external radiofrequency reader for example uses radiowaves and in particular the UHF band (UHF being the acronym of Ultra-High Frequency). Therefore, the characteristics of the helical spring are adjusted for the chosen communication frequency. Thus, the disappearance of the mechanical junction between the printed circuit board and the radiating antenna improves the mechanical resistance of the radiofrequency transponder.

However, such a passive radiofrequency transponder exhibits weaknesses in its use when incorporated into a tyre casing. Although this radiofrequency transponder is suitable for operating at the communication frequency of the external radiofrequency reader, the radiofrequency communication via the radiating antenna is not optimal, in particular for long-distance interrogations. In addition, it is also necessary to give consideration to how the radiating antenna will behave mechanically in an environment that is highly stressful thermomechanically. Thus, it is necessary to optimize the performance-related compromise between the mechanical strength of the antenna and its radiocommunication efficacy, such is its radio electric performance and, secondarily, its electromagnetic performance, in order to optimize the potential performance of such a passive radiofrequency transponder.

The present invention relates to a tyre casing fitted with a passive radiofrequency transponder aimed at improving the performance-related compromise, and in particular the radiocommunication performance of passive radiofrequency transponders used in a tyre design when used on a vehicle.

SUMMARY OF THE INVENTION

The invention relates to a tyre casing that is toroidal in shape about a reference axis and equipped with a passive radiofrequency transponder. The tyre casing comprises:

a crown block comprising a crown reinforcement having an axial end at each of its edges, and a tread, connected at each of its axial ends to a bead having an interior end situated axially and radially on the inside of the bead with respect to the reference axis, by a sidewall, a carcass reinforcement comprising at least one carcass reinforcement layer formed of mutually parallel reinforcing elements inserted between two skim layers of elastomer compound, the at least one carcass reinforcing layer being anchored in each of the beads by being turned up around an annular bead wire to form a main part of the at least one carcass reinforcement layer, extending from one bead wire to the other and situated radially on the inside with respect to the crown block, and a turn-up of the at least one carcass reinforcement layer in each of the beads, a second layer of elastomer compound forming the exterior surface of the tyre casing in the region of the bead, said second layer of elastomer compound being intended to come into contact with the rim, a third layer of elastomer compound situated radially on the outside in contact with the second layer of elastomer compound forming the exterior surface of said sidewall, the passive radiofrequency transponder comprising an electronic portion and a radiating dipole antenna, the radiating dipole antenna consisting of a single-strand helicoidal spring defining a helix pitch P, a winding diameter D, a midplane and a wire diameter defining an interior diameter and an exterior diameter of the radiating antenna, of which the length is designed to communicate on a frequency band with a radiofrequency reader defining a first longitudinal axis, a central region and two lateral regions along the first longitudinal axis, the electronic portion comprising an electronic chip and a primary antenna of coil type comprising at least one turn, and thus defining a second longitudinal axis and a midplane perpendicular to the second longitudinal axis, the primary antenna being galvanically connected to the electronic chip and electromechanically coupled to the radiating dipole antenna and being circumscribed by a cylinder of which the axis of revolution is parallel to the second longitudinal axis and of which the diameter is greater than or equal to one third of the interior diameter of the radiating antenna situated plumb with the primary antenna, the passive radiofrequency transponder being arranged in such a way that the first and second longitudinal axes are parallel and that the midplane of the primary antenna is positioned in the central region of the helical spring.

The tyre casing is characterized in that, with the radiating dipole antenna comprising a first region in which the radiating dipole antenna is not situated plumb with the electronic portion, the ratio between the helix pitch P1 and the winding diameter D1 for at least one loop of the helical spring in the first region is greater than 0.8, in that the radiating dipole antenna is situated plumb with at least two reinforcing elements of the main part of the at least one carcass reinforcement layer, and in that the passive radiofrequency transponder is situated axially on the outside of the interior end of the bead and radially between the radially outermost end of the bead wire and the axial end of the crown reinforcement, preferably on the inside of the tyre casing.

Here, the term "elastomer" is understood to mean all the elastomers including TPEs (acronym of ThermoPlastic Elastomers), such as for example diene polymers, i.e. polymers comprising diene units, silicones, polyurethanes and polyolefins.

Here, the term "electromagnetic coupling" is understood to mean coupling via electromagnetic radiation, i.e. the transfer of energy without physical contact between two systems including, on the one hand, inductive coupling and, on the other hand, capacitive coupling. The primary antenna is then preferably comprised in the group comprising: a coil, a loop or a wire segment or a combination of these conductive elements.

Here, the term "parallel" is understood to mean that the angle generated by the axial directions of each antenna is smaller than or equal to 30 degrees. In this case, the electromagnetic coupling between the two antennas is optimal, notably improving the communication performance of the passive radiofrequency transponder.

Here, the median plane of the coil and of the helical spring should first be defined. By definition, it is a fictional plane separating the object into two equal portions. In our case, this median plane is perpendicular to the axis of each antenna. Lastly, here the term "central region" is understood to mean that the relative distance between the median planes is smaller than one tenth of the length of the radiating antenna.

Thus, since the electrical current strength is of maximum magnitude at the centre of the radiating antenna, the magnetic field induced by this current is also maximum at the centre of the radiating antenna, and thus it is ensured that the inductive coupling between the two antennas is optimal, thereby improving the communication performance of the passive radiofrequency transponder.

By defining the relative dimensions of the primary antenna with respect to the characteristics of the helical spring of the radiating antenna, it is ensured that the distance between the two antennas will be smaller than the diameter of the primary antenna in the case where the primary antenna is located inside the radiating antenna. Thus, the electromagnetic coupling between the two antennas and therefore the communication performance of the radiofrequency transponder are optimized in transmission and in reception.

Likewise, outside of the region of the radiating antenna that is located plumb with the electronic portion and therefore with the primary antenna, a ratio of the helix pitch to the winding diameter higher than 0.8 for a loop of the radiating antenna has the effect of stretching the helical spring. Thus, the length of wire needed to cover a nominal distance of the radiating antenna is decreased. Thus, the resistance of the radiating antenna is decreased. Therefore, for a given electric field, the strength of the electrical current flowing through the radiating antenna is of higher magnitude at the natural frequency of the antenna, this allowing the communication performance of the radiofrequency transponder to be improved. In addition, stretching the helical spring allows the efficiency of the radiating antenna to be improved by improving the ratio between the radiation resistance and loss resistance thereof, this also allowing the electric field radiated by the radiating antenna for a given flow of electrical current through the radiating antenna to be maximized. Lastly, for the radiating antenna of given pitch, stretching the radiating antenna allows the volume occupied by the helical spring to be decreased. Thus, in a constrained dimensional environment, such as the thickness of a tyre casing, it is possible to increase the thickness of insulating rubber surrounding the radiating antenna in this first region. This electrical insulation minimizes losses and therefore improves the communication performance of the radiofrequency transponder, both in transmission and in reception. Of course, it is ideal for each of the loops of the first region of the radiating antenna to be elongated, this correspondingly improving the communication performance of the passive radiofrequency transponder, in particular when it is an RFID tag.

The term "plumb with two reinforcing elements" is understood to mean that the orthogonal projection of the element, in this case the radiating dipole antenna, onto the plane defined by two parallel reinforcing elements of the main part of the at least one carcass reinforcement layer intersects these two reinforcing elements when the tyre casing is in the green tyre state, Finally, the fact that the characteristic dimension of the radiating dipole antenna, which dimension is defined by the first longitudinal axis, is situated plumb with several reinforcing elements of the carcass reinforcement layer ensures that the passive radiofrequency transponder is in a controlled position in the thickness of the tyre casing, notably at the time of manufacture thereof during the tyre building and curing steps. Specifically, this configuration reduces the possible shifting of the radiating dipole antenna within the various non-crosslinked layers, notably with respect to the carcass reinforcement layer, when the tyre casing is being built up in the green state. Because the main carcass reinforcement layer of the tyre casing runs from one bead wire to the other, that provides a wide region in which the passive radiofrequency transponder can be installed, and be operational, in the tyre casing. Specifically, the quantity of an elastomeric material surrounding the passive radiofrequency transponder is thus controlled, so that the length of the radiating dipole antenna can be tuned to the electrical environment of the radiating dipole antenna within the tyre reliably and robustly.

Finally, the radiofrequency transponder is situated in the bead and sidewall region of the tyre casing, notably between the bead wire and the crown reinforcement of the crown block, so as to facilitate communication between it and an external radiofrequency reader notably in operation on the vehicle. Specifically, because the metallic elements of the bodywork of the vehicle, such as the wing or the wheel which are generally made of metal hinder propagation of radioelectric waves to or from the passive radiofrequency transponder situated with the tyre casing, notably in the UHF frequency range, installing the passive radiofrequency transponder in the sidewall and bead region, radially on the outside of the bead wire, of the tyre casing makes it easier for the passive radiofrequency transponder to be interrogated and read by an external radiofrequency reader from a long distance in numerous positions of the external radiofrequency reader when the tyre casing is in service on a vehicle. The communications with the passive radiofrequency transponder are therefore robust and reliable. Although not essential for radiofrequency communication, the passive radiofrequency transponder is situated on the inside of the tyre casing. It is then incorporated into this casing during the manufacture of the tyre casing, thereby safeguarding the read-only data contained in the memory of the electronic chip of the passive radiofrequency transponder such as, for example, the tyre casing identifier. The alternative is to use techniques known in the prior art to affix a patch made from an elastomer compound containing said passive radiofrequency transponder to the external surfaces of the tyre casing such as, for example, to the layer of inner liner or to the sidewall. This operation may be performed at any moment during the course of the life of the tyre casing, making the tyre casing data contained in the memory of the electronic chip of the passive radiofrequency transponder less reliable.

Optionally, with the radiating dipole antenna comprising a second region in which the radiating dipole antenna is located plumb with the electronic portion, the ratio between the helix pitch P2 and the winding diameter D2 for each loop of the second region is lower than or equal to 0.8.

Specifically, in this second region of the radiating dipole antenna, and more particularly in the region located plumb with the primary antenna, the effect expected from the radiating dipole antenna is electromagnetic, and in particular inductive, coupling with the primary antenna of the electronic portion. Thus, a first lever for improving this coupling is to increase the inductance of the radiating antenna in this second region, this amounting to contracting the helical spring. In addition, contracting the radiating dipole antenna in this second region also promotes the transfer of energy between the primary antenna and the radiating dipole antenna by increasing, for a given length of the primary antenna located facing the radiating dipole antenna, the area of exchange furnished by the radiating dipole antenna. This improvement in energy transfer leads to a better communication performance being obtained from the passive radiofrequency transponder.

Preferably, the ratio between the helix pitch and the winding diameter of each of the loops of the helical spring in the first region of the radiating antenna is lower than 3, and preferably lower than 2.

Although it is advantageous to improve the radioelectric performance of the radiating antenna, it is necessary to also not neglect the other functions that it must perform. In particular, the helical spring is an extendable structure designed to withstand the three-dimensional stresses that the radiofrequency transponder in a tyre casing will have to face from the building of the tyre casing to the use of the tyre casing as an object of mobility on the vehicle. Thus, it is recommended to limit the amount by which the radiating antenna is stretched in this first region in order to ensure the radiating antenna preserves a sufficient suppleness on the whole and thus to ensure the physical integrity of the passive radiofrequency transponder.

Preferably, the primary antenna being connected to the terminals of a circuit board comprising the electronic chip, the electrical impedance of the primary antenna is matched to the electrical impedance of the circuit board of the radiofrequency transponder.

The term "electrical impedance of the circuit board" is understood to mean the electrical impedance across the terminals of the primary antenna, this representing the electrical impedance of the circuit board comprising at least one electronic chip and a printed circuit board to which the electronic chip is connected.

By matching the impedance of the primary antenna to that of the circuit board, the radiofrequency transponder is optimized at the communication frequency by improving the gain and achieving a circuit board of more selective form factor and narrower passband. Thus, the communication performance of the radiofrequency transponder is improved for a given amount of energy transmitted to the radiofrequency transponder. This in particular results in an increase in the read distance of the radiofrequency transponder for a given emitted radioelectric power. The impedance match of the primary antenna is obtained by adjusting at least one of the geometric features of the primary antenna, such as, for example, the diameter of the wire, the material of this wire and the length of the wire.

The impedance match of the primary antenna may also be obtained by adding an impedance-matching circuit made up of additional electronic components between the primary antenna and the electronic circuit, such as, for example, filters based on an inductor, capacitors and transmission lines.

The impedance match of the primary antenna may also be obtained by combining features of the primary antenna and features of an impedance-matching circuit.

According to one particular embodiment, the electronic chip and at least one portion of the primary antenna are embedded in a stiff and electrically insulating mass, such as, for example, high-temperature epoxy resin. This assembly forms the electronic portion of the radiofrequency transponder.

Thus, the electronic portion comprising at least one portion of the primary antenna and the electronic chip connected to the printed circuit board is stiffened, making the mechanical connections between the components thereof more reliable with respect to the thermomechanical stresses to which the tyre casing is subjected, both while it is being connected and while it is in use.

This also allows the electronic portion of the radiofrequency transponder to be manufactured independently of the radiating antenna or of the tyre casing. In particular, for example, using a micro-coil of a number of turns as primary antenna allows miniaturization of the electronic component comprising the primary antenna and the electronic chip to be envisaged.

According to another embodiment, the portion of the primary antenna not embedded in the stiff mass is coated with an electrically insulating material.

Thus, if the primary antenna is not entirely contained in the stiff and electrically insulating mass of the electronic portion, it is useful to insulate it via a coating made of an electrically insulating material, such as those employed for an insulating sheath of an electrical cable.

According to one specific embodiment, the tyre casing comprises a fourth layer of elastomer compound situated axially on the outside of the main part of at least one carcass reinforcement layer and axially on the inside of the second and/or third layer of elastomer compound.

Thus, this configuration of tyre casing provides a compromise in the performance of the bead and of the side wall that are differentiating and the passive radiofrequency transponder can be inserted in contact with this fourth layer of elastomer compound. This fourth layer of elastomer compound may, for example, be a bead wire filling rubber situated between the main part and the turn-up of the carcass reinforcement layer radially on the outside of the bead wire. It may also be a bead and/or side wall filling rubber between this bead wire filling rubber and/or the turn-up of the carcass reinforcement layer and the second and/or third layer of elastomer compound of the tyre casing.

The passive radiofrequency transponder may therefore be in contact with this fourth layer of elastomer compound.

According to another specific embodiment, with the tyre casing comprising an airtight layer of elastomer material, which is to say a layer that is highly impermeable to air that allows the pressurized tyre casing to be run on for at least one month without loss of inflation pressure in the absence of any incident befalling the tyre casing and under the same conditions of use, this layer being situated furthest towards the inside of the tyre casing, the tyre casing comprises a fifth layer of elastomer compound situated on the inside of the main part of the at least one carcass reinforcement layer.

This configuration of tyre casing, with its fifth layer of elastomer compound, particularly allows extended running thanks to the fifth layer of elastomer compound which is situated at the sidewall of the tyre casing. In the event of the tyre casing suffering a loss of inflation pressure, the fifth layer of elastomer compound allows the transmission of load between the bead and the crown block without causing the sidewall of the tyre casing to buckle.

The passive radiofrequency transponder may therefore be in contact with this fifth layer of elastomer compound.

According to one particular embodiment, the tyre casing comprises a reinforcement reinforcing layer formed of reinforcing elements inserted between two layers of rubber.

These are special-purpose casings which, depending on the type of use or in-service stress loadings, require localized reinforcements. For example, in the bead, this reinforcement reinforcing layer is able to prevent rubbing between the wheel and the tyre casing. This reinforcement reinforcing layer may also be located in a certain region, particularly the axial ends of the crown block, to constrain the geometry of the crown block and of the tyre casing under severe thermomechanical stress loadings, This reinforcement reinforcing layer generally has at least one free end. The passive radiofrequency transponder may then be in contact with or close to the free end of this reinforcement reinforcing layer made of elastomer compound.

According to one specific embodiment, the passive radiofrequency transponder is partially encapsulated in a mass of electrically insulating elastomer compound.

The term "electrically insulating" is understood here to mean that the electrical conductivity of the elastomer compound is at least below the conductive charge percolation threshold of the compound.

According to a final specific embodiment, the relative dielectric constant of the encapsulating mass is lower than 10.

This value of relative dielectric permittivity of the elastomer compounds that make up the encapsulating mass ensures the stability of the environment in which the passive radiofrequency transponder is situated, thus making the subject matter of the invention robust. Thus, the encapsulating mass assures the radio electric waves of an environment that remains constant, thus robustly fixing the dimension of the radiating dipole antenna for operation at the target communication frequency.

According to another specific embodiment, the tensile elastic modulus of the encapsulating mass is lower than the tensile elastic modulus of at least one elastomer compound adjacent to said encapsulating mass.

This then forms an assembly that makes the passive radiofrequency transponder easier to fit into the green tyre casing while restricting the mechanical singularity that the passive radiofrequency transponder constitutes within the tyre casing. A conventional bonding-rubber layer will possibly be employed, if necessary, to secure this assembly to the tyre casing.

In addition, the stiffness and electrical-conductivity characteristics of the elastomer compound ensure a quality mechanical insertion and electrical insulation of the passive radiofrequency transponder within the tyre casing. Thus, the operation of the radiofrequency transponder is not perturbed by the tyre casing.

According to a first preferred embodiment, the passive radiofrequency transponder is situated at an interface defined by a surface of a layer of elastomer compound of the tyre casing.

This is an embodiment which makes the passive radiofrequency transponder easier to fit into the architecture of the tyre casing. The fitting of the passive radiofrequency transponder takes place directly in the means for building the green tyre by said passive radiofrequency transponder being placed onto the external surface of a layer of elastomer compound. This layer of elastomer compound may also be a skim layer. The passive radiofrequency transponder will then be covered with a second layer of elastomer compound. In this way, the passive radiofrequency transponder is therefore fully encapsulated by the components of the tyre casing. It is therefore embedded within the tyre casing, ensuring that it cannot be falsified when the memory of the electronic chip is write protected.

As a preference, with the interface being defined by another layer of elastomer compound or a reinforcement layer, the passive radiofrequency transponder is situated at a distance of at least 5 millimetres from the ends of the layers at the interface.

The passive radiofrequency transponder presents as a foreign body in the build of the tyre, constituting a mechanical singularity. The ends of the layers at the interface also constitute mechanical singularities. To safeguard the endurance of the tyre casing, it is preferable for the two singularities to be distanced from one another by a certain distance. The greater this distance, the better, the minimum distance of the influence of a singularity being of course proportional to the size of this singularity. The singularity formed by the end of a layer becomes more sensitive the greater the stiffness of the layer in comparison with the stiffness of the adjacent layers such as, for example, a reinforcement reinforcing layer or a carcass reinforcing layer. When the reinforcers are made of metal or of textile of high stiffness, such as in the case of aramid, for example, it is appropriate to keep the two singularities at least 10 millimetres apart.

According to a second preferred embodiment, the passive radiofrequency transponder is situated on the inside of a layer of elastomer compound of the tyre casing.

This second embodiment has the advantage of leaving the choice as to the exact position of the passive radiofrequency transponder depending on the thickness of the tyre casing, unlike in the first preferred embodiment which imposes the position by the interface between the layers of elastomer compound. It is thus also possible to encapsulate the passive radiofrequency transponder in a mass of elastomer compound that is uniform from an electrical insulation and stiffness viewpoint, facilitating good radiofrequency and mechanical operation of the passive radiofrequency transponder. This also allows the radiofrequency transponder to be prepared for incorporation into the layer of elastomer compound away from the means used for building the tyre casing, and this proves to be more productive. Thus, this second preferred embodiment offers a wider choice for the installation of the passive radiofrequency transponder within the tyre casing.

Advantageously, the first longitudinal axis of the radiating dipole antenna of the passive radiofrequency transponder is perpendicular to the thickness of the layer of elastomer compound.

The layers of elastomer compound are generally thick layers partially superposed on one another to build a tyre casing. In order to gain best control over the positioning of the passive radiofrequency transponder within the tyre casing it is preferable for the main dimension of the passive radiofrequency transponder, namely the first longitudinal axis, to be oriented perpendicular to the thickness of the layer of elastomer compound. This avoids the risk of the radiofrequency transponder, inclined with respect to the surface of the elastomer compound, passing through the external surface of the layer of elastomer compound during manufacture of the tyre and into another layer. Such an instance could potentially be harmful to the endurance of the tyre casing.

Highly advantageously, the passive radiofrequency transponder is situated at a distance of at least 0.3 millimetres from the surfaces of the layer of elastomer compound.

A "distance of at least 0.3 millimetres" is understood to mean that any external material point of the first object, in this instance the passive radiofrequency transponder potentially equipped with its encapsulating mass, is situated at a distance that is greater than or equal to 0.3 millimetres from any material point of the second object, in this instance the surfaces of the layer of elastomer compound. In particular, this distance of 0.3 millimetres is to be measured in the cured state.

This then prevents the risk of any potential shifting of the passive radiofrequency transponder within the layer of elastomer compound under thermomechanical stresses, or any spread in the positioning of the passive radiofrequency transponder within the layer of elastomer compound during the phase of manufacturing the tyre casing. This positioning will not cause the passive radiofrequency transponder to leave the layer of elastomer compound. This then ensures controlled mechanical and electrical insulation of the passive radiofrequency transponder within the layer of elastomer compound, which in turn ensures the endurance of the tyre casing and of the radiofrequency transponder while at the same time guaranteeing good radiofrequency operation.

According to one specific embodiment, the radioelectric communication with the radiofrequency reader occurs in the UHF band and most specifically in the range comprised between 860 and 960 MHz.

Specifically, in this frequency band, the length of the radiating antenna is inversely proportional to the communication frequency. Furthermore, outside of this frequency band, radioelectric communication is highly perturbed or even impossible through standard elastomeric materials. Thus, this is the best compromise between the size of the radiofrequency transponder and its radioelectric communication, in particular in the far-field, making it possible to have communication distances that are satisfactory for the field of tyres.

According to another particular embodiment, the length L0 of the radiating antenna is comprised between 30 and 50 millimetres.

Specifically, in the frequency range between 860 and 960 MHz and depending on the relative dielectric permittivities of the elastomer compounds surrounding the radiofrequency transponder, the total length of the helical spring, which is tailored to the half-wavelength of the radioelectric waves transmitted or received by the radiofrequency transponder, is located in the interval between 30 and 50 millimetres, and preferably between 35 and 45 millimetres. In order to optimize the operation of the radiating antenna at these wavelengths, it is recommended to perfectly tailor the length of the radiating antenna to the wavelength.

Advantageously, the winding diameter of the helical spring in the first region of the radiating antenna is comprised between 0.6 and 2.0 millimetres, and preferably between 0.6 and 1.6 millimetres.

This allows the volume occupied by the radiating antenna to be limited and therefore the thickness of electrically insulating elastomer compound around the radiofrequency transponder to be increased. Of course, this diameter of the helical spring in the first region of the radiating antenna may be constant, variable, continually variable or piecewise variable. It is preferable from a point of view of the mechanical integrity of the radiating antenna for the diameter to be constant or continuously variable.

According to one preferred embodiment, the helix pitch of at least one loop of the radiating antenna in the first region of the radiating antenna is comprised between 1 and 4 millimetres, and preferably between 1.3 and 2 millimetres.

This makes it possible to ensure that the ratio of the helix pitch to the winding diameter of the spring, or at least one loop, in the first region of the radiating antenna is lower than 3, guaranteeing a minimum of elongation of the helical spring. In addition, this pitch may also be constant or variable throughout the first region of the radiating antenna. Of course, it is preferable for the pitch to be continuously variable or variable with small transitions in variation in order to avoid singular points in the radiating antenna that would form mechanical weaknesses in the radiating antenna.

According to one advantageous embodiment, the diameter of the wire of the radiating antenna is comprised between 0.05 and 0.25 millimetres, and ideally between 0.12 and 0.23 millimetres.

In this wire range, loss resistance is certain to be low, thus improving the radioelectric performance of the radiating antenna. In addition, limiting the diameter of the wire allows the distance between the radiating antenna and the electrical conductors to be increased by increasing the thickness of the electrically insulating elastomer compounds. However, it is necessary for the wire to preserve a certain mechanical strength in order to be able to bear the thermomechanical stresses that it will undergo in a highly stressed environment such as a tyre casing, without optimizing the breaking stress of the material of these wires, which is generally mild steel. This makes it possible to ensure the radiating antenna represents a satisfactory technical/economical compromise.

Advantageously, the first pitch P1 of the radiating dipole antenna, which corresponds to the helix pitch of the radiating dipole antenna in the first region is greater than the second pitch P2 of the radiating dipole antenna which corresponds to the helix pitch of the radiating dipole antenna in the second region in which the radiating dipole antenna is situated plumb with the electronic portion.

By requiring that the helix pitch P2 of the radiating dipole antenna in a second region in which the radiating dipole antenna is located plumb with the electronic portion be smaller than the pitch P1 of the radiating dipole antenna outside this region, the electromagnetic aptitudes of the radiating dipole antenna in this region are favoured to the detriment of its radiating efficacy, which are promoted in the first region of the radiating dipole antenna. Thus, the compression of the helix pitch of the radiating dipole antenna improves the inductance of the antenna in this region. For a given flow of electrical current through the radiating dipole antenna, this is a lever arm that is essential to increase the magnetic field generated by the antenna. Furthermore, this improvement in the inductance of the radiating dipole antenna is obtained without necessarily modifying the winding diameter of the radiating antenna. In addition, for a primary antenna of given length, the compression of the pitch of the radiating dipole antenna plumb with the primary antenna of the electronic portion ensures a larger area of exchange between the two antennas, thus also improving the electromagnetic coupling between the two antennas. Thus, the communication performance of the radiofrequency transponder is thereby improved. Lastly, the compression of the pitch of the radiating dipole antenna allows the manufacturing tolerances on the radiating dipole antenna to be minimized and better controlled in this second region, in particular as regards the definition of the winding diameter of the radiating dipole antenna. Thus, the scrap rate for the radiating dipole antennas is reduced since it is the control over this diameter that governs the positioning of the electronic portion with respect to the radiating dipole antenna.

Highly advantageously, with the electronic portion being placed inside the radiating antenna, the first inside diameter D1' of the radiating dipole antenna in the first region is smaller than the second inside diameter D2' of the radiating dipole antenna in a second region, and the electronic portion is circumscribed by a cylinder of which the axis of revolution is parallel to the first longitudinal axis and of which the diameter is larger than or equal to the first inside diameter D1' of the radiating dipole antenna.

By ensuring that the cylinder that circumscribes the electronic portion has an axis of revolution parallel to the first longitudinal axis and a diameter larger than or equal to the first inside diameter of the radiating dipole antenna, the first region of the radiating antenna therefore forms a stop with respect to the axial movement of the electronic portion. The fact that this first region is situated on each side of that region of the radiating dipole antenna that is situated plumb with the electronic portion because of the centred positioning of the electronic portion with respect to the radiating dipole antenna, ensures that there are therefore two mechanical end stops situated axially on the outside of the electronic portion and limiting any axial movement of the electronic portion of the radiofrequency transponder. In addition, because the diameter of the cylinder circumscribing the electronic portion is situated on the inside of the radiating antenna in the second region, this diameter has to be smaller than the second inside diameter of the radiating antenna. Thus, any radial shifting of the electronic portion is confined by the second inside diameter of the radiating dipole antenna. In conclusion, the movement of the electronic portion is limited, this allowing the communication performance of the radiofrequency transponder to be ensured while ensuring a physical integrity of the electronic portion and of the radiating dipole antenna of the passive radiofrequency transponder. Lastly, the endurance of the tyre casing accommodating this radiofrequency transponder is also not impacted by this choice of design. Furthermore, the radiofrequency transponders are made easier to handle for fitting into the structure of the tyre casing without the need to take additional precautions.

BRIEF DESCRIPTION OF THE DRAWINGS

The invention will be better understood by means of the following detailed description. These applications are given solely by way of example and with reference to the appended figures, throughout which the same reference numerals denote identical parts, and in which.

DETAILED DESCRIPTION OF EMBODIMENTS

Below, the terms "tyre" and "pneumatic tyre" are employed equivalently and refer to any type of pneumatic or non-pneumatic tyre (inflated or non-inflated tyre).

Figure 1:
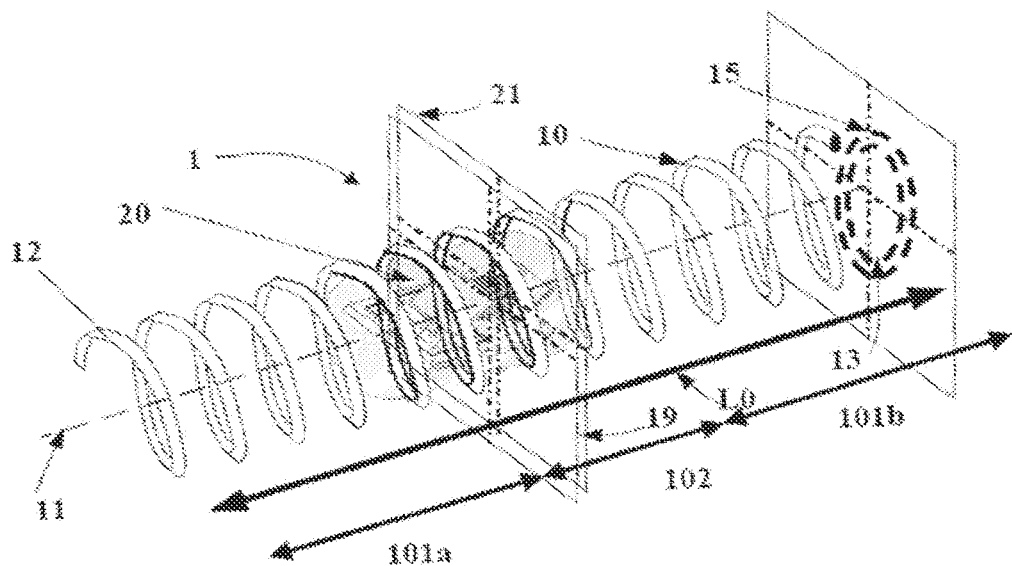
FIG. 1 shows a perspective view of a radiofrequency transponder of the prior art.

FIG. 1 shows a prior-art radiofrequency transponder 1 in a configuration in which the electronic portion 20 is located inside the radiating antenna 10. The radiating antenna 10 consists of a steel wire 12 that has been plastically deformed in order to form a helical spring having an axis of revolution 11. The helical spring is defined primarily by a winding diameter of the coated wire and a helix pitch. These two geometric parameters of the helical spring are constant here. Thus, inside 13 and outside 15 diameters of the helical spring are precisely determined taking the diameter of the wire into account. The length L0 of the spring corresponds here to one half-wavelength of the radiofrequency transmission signal of the transponder 1 in a mass of elastomer compound. It is thus possible to define a median plane 19 of the helical spring perpendicular to the axis of revolution 11 separating the radiating antenna 10 into two equal parts. The geometric shape of the electronic portion 20 is circumscribed in a cylinder, the diameter of which is smaller than or equal to the inside diameter 13 of the helical spring. This makes it easier for the electronic portion 20 to be inserted into the radiating antenna 10. The median plane 21 of the primary antenna is located substantially superposed with the median plane 19 of the radiating antenna 10. Lastly, the axis of the primary antenna is substantially parallel to the axis of revolution 11 of the radiating antenna 10. The radiating antenna may be divided into two distinct regions: a first region 101 of the radiating antenna 10, in which the helical spring is not situated plumb with the electronic portion 20, and a second region 102 situated plumb with the electronic portion 20. The first region 101 of the radiating antenna 10 comprises two portions 101a and 101b of substantially equivalent lengths, these portions axially flanking the second region 102 of the radiating antenna 10.

Figure 2:
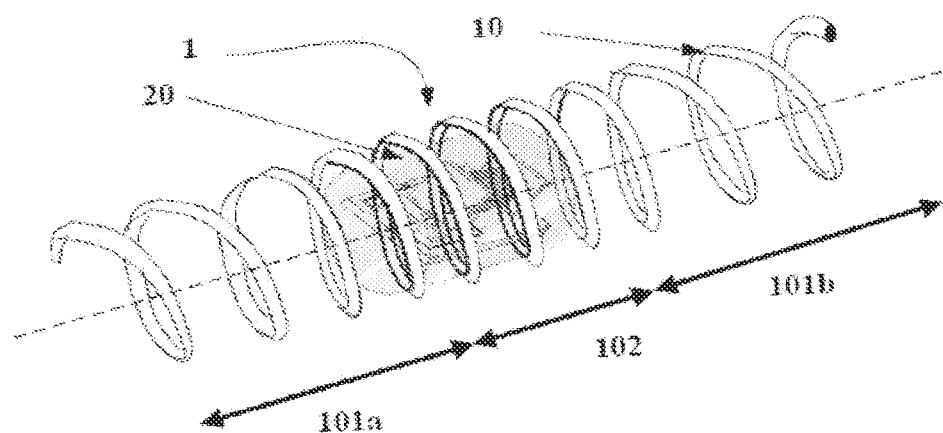
FIG. 2 shows a perspective view of a radiofrequency transponder according to the invention.

FIG. 2 is a radiofrequency transponder 1 according to the invention, which has, with respect to the prior-art radiofrequency transponder, the distinctive feature that the ratio of the helix pitch to the winding diameter of at least one loop of the radiating antenna of the first region is higher than 0.8. In our case, all the loops of each of the regions 101a and 101b have had their ratio changed equivalently. This is achieved by decreasing the total number of loops in each of the sub-regions 101a and 101b. In this particular case, the winding diameter for the winding of the wire of the radiating antenna 10 is kept the same. However, it would also have been possible to modify the ratio of the helix pitch to the winding diameter of each loop of the first region 101 by increasing the winding diameter for the winding of the steel wire of the radiating antenna 10 in the first region 101 of this antenna. In our case, the helix pitch of the radiating antenna 10 in the second region 102 of the radiating antenna 10 has not been modified. Thus, the ratio between the helix pitch and the winding diameter in the second region 102 of the radiating antenna 10 is lower than 0.8.

Figure 3A:
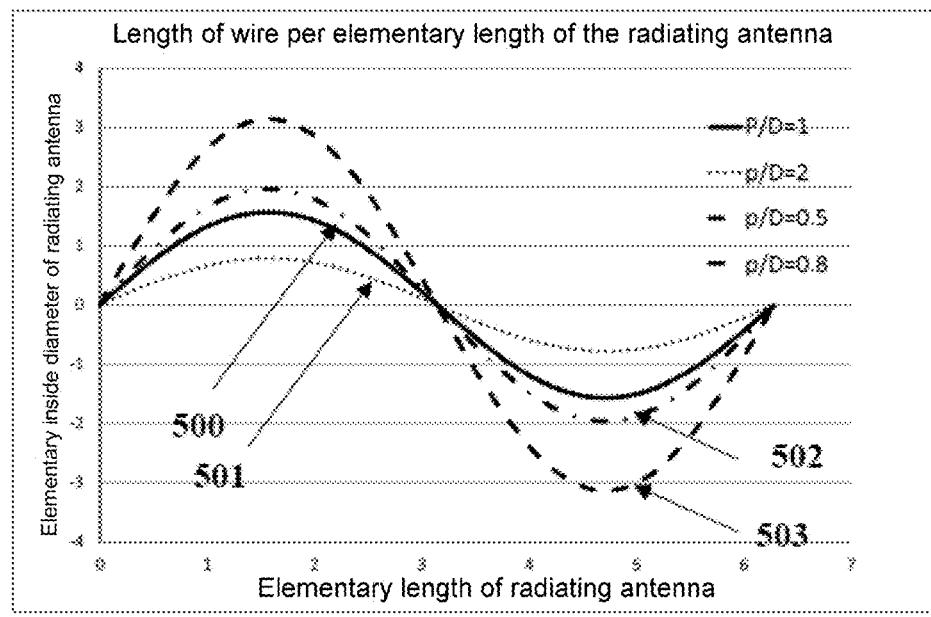
FIGS. 3a and 3b are illustrations of the length of the wire of the radiating antenna depending on the ratio between the helix pitch and the winding diameter of the helical spring for a given elementary length of the radiating dipole antenna and depending on whether a constant pitch or constant winding diameter is employed.
Figure 3B:
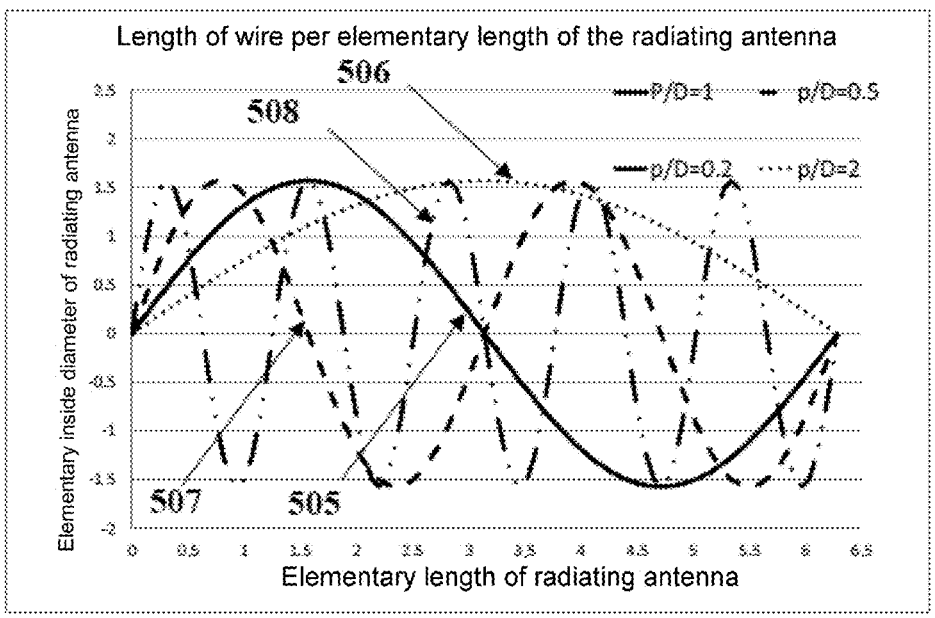

FIGS. 3a and 3b are illustrations of the importance, with respect to the radioelectric and electromagnetic properties of the radiating antenna, of the ratio of the helix pitch to the winding diameter, for one loop of the helical spring.

FIG. 3a is an illustration of variations in the ratio of the helix pitch to the winding diameter of a loop when the helix pitch of the loop and the diameter of the wire from which the loop is formed remain constant. For an elementary length of the radiating antenna of length equal to the region occupied by a complete loop for a ratio equal to 1, the curvilinear distance of this loop is equal to 2*PI*PI elementary units. The curve 500 drawn with a solid line corresponds to this loop. Specifically, the radius of this loop is necessarily equal to PI elementary units. Considering now the curve 501 drawn in dotted line which corresponds to a ratio equal to 2, because the helix pitch is constant, the winding diameter of this loop must be a factor of two times smaller than the winding diameter of the previous loop, namely PI elementary units. Thus, the curvilinear distance of this loop illustrated by the dotted line 501 is equal to PI*PI elementary units. Therefore, the curvilinear length of a first loop, having a higher ratio of helix pitch to winding diameter than a second loop, is smaller than the curvilinear length of this second loop. The curve 502 drawn with the dashed line and the curve 503 drawn with the dash-dot line illustrate ratios of 0.8 and of 0.5, respectively. The curvilinear lengths of these two loops are equal to 2.5*PI*PI elementary units and 4*PI*PI elementary units, respectively.

FIG. 3b is an illustration of the variations in the ratio of the helix pitch to the winding diameter of a loop when the diameter of the loop and the diameter of the wire from which the loop is formed remain constant. For an elementary length of the radiating antenna of length equal to the region occupied by a complete loop for a ratio equal to 1, the curvilinear distance of this loop is equal to 2*PI*PI elementary units. The curve 505 drawn with a solid line corresponds to this loop. Specifically, the radius of this loop is necessarily equal to PI elementary units. Considering now the curve 506 which corresponds to a ratio equal to 2, because the winding diameter is constant, the helix pitch of this loop must be a factor of two times larger than the helix pitch of the previous loop, namely 4*PI elementary units. However, if the elementary length is limited to 2*PI elementary units, the curvilinear distance of this loop illustrated in dotted line is equal to PI*PI elementary units. Likewise, for curves 507 and 508 which correspond to ratios of 0.5 and 0.2 respectively, i.e. a doubling and a fivefold increase in the number of loops respectively, the curvilinear distance of the curve 507 illustrated in dotted line is equal to 4*PI*PI elementary units. Furthermore, the curvilinear distance of the curve 508 drawn in dash-dot-dot line is equal to 10*PI*PI elementary units.

Of course, instead of solely modifying the helix pitch or the winding diameter of each loop, it is possible to modify both parameters simultaneously. Only the ratio obtained via these two modifications will have an impact on the communication performance of the radiating antenna.

Specifically, the resistance of a conductive wire is proportional to the curvilinear length of the wire. The higher the ratio of the helix pitch to the winding diameter of the loop, the shorter the curvilinear length of the wire. Thus, the lower the electrical resistance of the loop. In conclusion, the radioelectric properties of the loops of the radiating antenna are improved by minimizing this electrical resistance. By minimizing the electrical resistance of the radiating antenna in the first region of the radiating antenna, the radiation efficiency of the antenna is improved both in transmission and in reception, the antenna mainly consisting of this first region. In addition, minimizing the electrical resistance of the antenna ensures a maximum electrical current is generated for a given electrical potential difference. Thus, the radioelectric performance and therefore the communication performance of the radiofrequency transponder are thereby improved.

As regards the second region of the radiating antenna, the radiation efficiency of this second region, which is smaller than the first region, is not essential. Specifically, the main function of this second region is to ensure electromagnetic coupling to the primary antenna of the electronic portion. This electromagnetic coupling is mainly due to inductive coupling if the primary antenna is a coil of a number of turns. For this coupling to occur, the radiating antenna must first generate a magnetic field. This magnetic field is in particular dependent on the inductance of the radiating antenna. To maximize the inductance of a coil, it is recommended to decrease the ratio of the helix pitch to the winding diameter of the coil or to increase the number of loops of the coil. By decreasing the ratio of the helix pitch to the winding diameter of the loops of the second region of the radiating antenna, the inductive coupling is maximized by increasing the inductance of the antenna. In addition, if this ratio is decreased by modifying only the helix pitch of the antenna, the number of turns making up the second region of the antenna is increased, this increasing the area of energy transfer between the two antennas. This increase in the area of energy transfer is of course favourable to the communication performance of the radiofrequency transponder.

Figure 4:
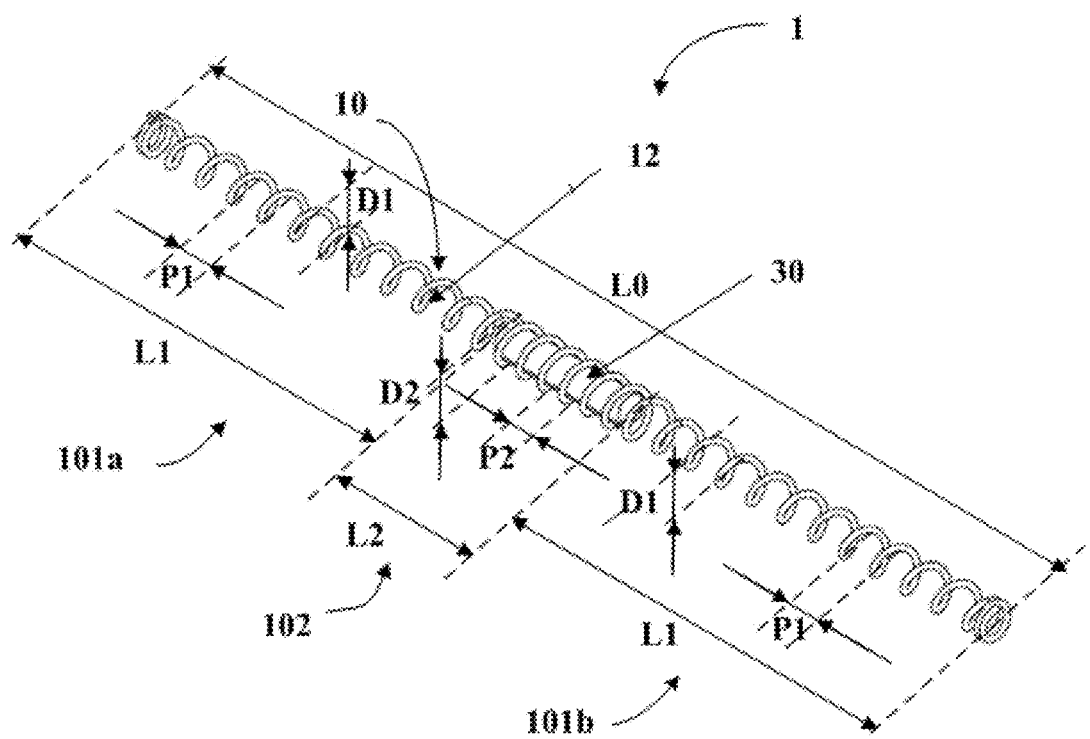
FIG. 4 is one example of a radiofrequency transponder according to the invention, having certain particularities.
Figure 4:
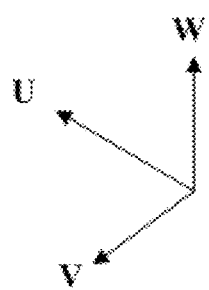

FIG. 4 is an illustration of a radiofrequency transponder 1 operating in the frequency range between 860 and 960 MHz and intended to be incorporated into a tyre casing. To improve the radiocommunication performance and the physical integrity of the radiofrequency transponder 1 within a tyre casing having a bead wire, without thereby impairing the endurance of the tyre casing, it will be preferable to arrange the axis of revolution of the radiating antenna 10 parallel to the axis U so that it rests on at least two reinforcing elements of the carcass reinforcement layer of the tyre casing. In particular, if the tyre casing has a single carcass reinforcement layer, as for example in a conventional tyre casing for a radial tyre, the axis of revolution of the radiating antenna 10 will be perpendicular to the direction of reinforcement defined by the radial reinforcing elements of the carcass reinforcement layer so that the mechanical anchor points for the passive radiofrequency transponder can be multiplied particularly if this transponder is incorporated during the course of manufacture of the tyre casing. As a result, the passive radiofrequency transponder 1 will be positioned circumferentially with respect to the axis of revolution or the reference axis of the tyre casing.

In addition, the radiofrequency transponder will be positioned axially on the outside with respect to the axially inner end of the bead. This is region that is mechanically stable as it does not experience sizeable unforeseen variations in thermomechanical deformation. Finally, the passive radiofrequency transponder 1 will be placed radially between the radially upper end of the bead wire and the axial end of the crown block of the tyre casing. This positioning in the radial direction makes it easier for the passive radiofrequency transponder incorporated into a tyre casing of a land vehicle to communicate with a radiofrequency reader situated outside the land vehicle as there are few conducting elements interposed between the radiofrequency reader and the passive radiofrequency transponder 1.

The radiofrequency transponder 1 here comprises a radiating antenna 10 and an electronic portion located inside the radiating antenna 10. The electronic portion comprises an electronic chip connected to a printed circuit board and a primary antenna consisting of a conducting wire comprising seventeen rectangular turns connected to the printed circuit board. The face of the printed circuit board opposite to the primary antenna comprises a galvanic circuit of meander shape forming a line of 10 millimetres length and of 1 millimetre width. Lastly, the diameter of the cylinder circumscribing the primary antenna is 0.8 millimetres.

The circuit board thus formed is embedded in a mass 30 of epoxy resin, ensuring the mechanical reliability of the electronic components and the electrical insulation of the circuit board. The cylinder circumscribing the stiff mass 30 has a diameter of 1.15 millimetres and a length of 6 millimetres.

The length L0 of the radiating antenna 10 is here 45 millimetres and corresponds to one half-wavelength of radioelectric waves at a frequency of 915 MHz in a medium of relative dielectric permittivity of about equal to 5. The radiating antenna 10 is produced using a steel wire 12 of 0.225 millimetre diameter the surface of which is coated with a layer of brass.

The radiating antenna 10 may be divided into two main regions. The first region 101 corresponds to the section of the radiating antenna that is not located plumb with the electronic portion. It comprises two sub-regions 101a and 101b flanking on either side the stiff and insulating mass 30.

Each sub-region 101a, 101b has a length L1 of 19 millimetres and comprises 12 circular turns of a constant winding diameter D1 of 1.275 millimetres. This defines inside and outside diameters of 1.05 and 1.5 millimetres, respectively. The helix pitch P1 of the circular turns is of 1.55 millimetres. Thus, the ratio of the helix pitch P1 to the winding diameter D1 of the turns is 1.21. The axially outer ends of each sub-region 101a and 101b ends in 2 adjoined turns. Thus, the high ratio ensures the efficacy of the radioelectric properties of the radiating antenna 10 is maximized in this region 101. In addition, the contact between the turns located outermost on the radiating antenna 10 prevents the helical springs from becoming interlaced with one another during handling of the radiofrequency transponders. As most of the turns of the first region 101 of the radiating antenna 10 have a ratio higher than 0.8, the radioelectric performance of the radiofrequency transponder 1 is clearly improved.

In the second region 102 of the radiating antenna 10, which corresponds to the section of the radiating antenna 10 located plumb with the electronic portion, the radiating antenna has a length of 7 millimetres. The helical spring has a constant helix pitch P2 of 1 millimetre and a constant winding diameter D2 of 1.575 millimetres. Thus, the inside diameter of the helical spring of the second region of the radiating antenna is 1.35 millimetres. This makes it possible to have a ratio of the helix pitch to the winding diameter that is constant of the order of 0.63. This ratio allows the inductance of the second region 102 of the radiating antenna 10 to be maximized with respect to the first region 101, this allowing the efficacy of the electromagnetic coupling to the electronic portion to be improved.

In this particular case, in the first region 101 the inside diameter of the radiating antenna 10, which is equal to 1.05 millimetres, is smaller than the diameter, equal to 1.15 millimetres, of the mass 30 as represented by the cylinder circumscribing the electronic portion. Thus, the sub-regions 101a and 101b of the first region 101 of the radiating antenna 10 form mechanical stops that limit the axial movement of the mass 30 inside the radiating antenna 10. The electronic portion is installed by inserting the stiff and insulating mass 30 into the radiating antenna 10.

In addition, the diameter of the cylinder circumscribing the primary antenna is much larger than one third of the inside diameter of the helical spring of the second region 102 of the radiating antenna. Although the cylinder circumscribing the primary antenna is not coaxial with the axis of revolution U of the radiating antenna 10, it is substantially parallel thereto. Furthermore, the minimum distance between the second region 102 of the radiating antenna 10 and the primary antenna is smaller than 0.3 millimetres, i.e. much smaller than one quarter of the inside diameter of the radiating antenna 10. This proximity of the antennas is permitted by the compressed pitch P2 applied in the second region 102 of the radiating antenna 10, which allows a lower tolerance to be obtained for the dimensions of the spring and in particular for the winding diameter D2. In addition, this proximity ensures better quality electromagnetic coupling between the two antennas. Of course, this electromagnetic coupling could have been improved by using turns of identical shape in the primary antenna and in the radiating antenna, such as circular turns for example. This coupling could also have been optimized by making the axes of the two antennas coaxial, this amounting to placing the circuit board inside the primary antenna in such a way as to minimize the axial dimension of the electronic portion. Thus, the quality of the area of transfer of electromagnetic energy between the two antennas would have been optimal.

Other specific embodiments, in particular in the case of variation of the winding diameter of the helical spring between the first and second regions of the radiating antenna, particularly in instances in which the inside diameter of the first region of the radiating antenna is smaller than the diameter of the cylinder circumscribing the electronic portion, may be employed.

Figure 5:
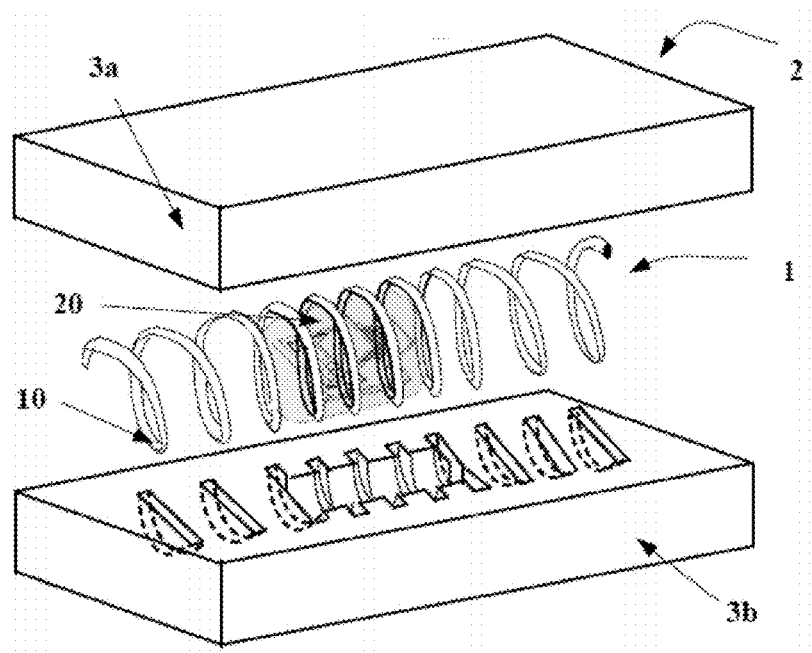
FIG. 5 is an exploded view of an identification tag according to the invention.

FIG. 5 shows an identification tag 2 comprising a radiofrequency transponder 1 according to the invention embedded in a supple mass 3 made of electrically insulating elastomeric material, this mass being made up of the blocks 3a and 3b. The radiofrequency transponder 1 is generally placed in the middle of the tag 2 in order to maximize the smallest distance between the first region 101 of the radiating antenna 10 and the external surface of the identification tag 2.

In the case where the ratio between the helix pitch and the winding diameter of the loop of the first region 101 of the radiating antenna 10 is increased by decreasing the winding diameter of the steel wire, the volume occupied by the radiofrequency transponder 1 within the mass 3 of elastomeric material is decreased.

This allows, in a first application, the thickness of each of the blocks 3a and 3b of the identification tag 2 to be decreased while keeping the same distance between the external surface of the identification tag 2 and the first region 101 of the radiating antenna 10. This decrease in the thickness of the identification tag 2 will facilitate its introduction into an object to be identified, while preserving the same electrical-insulation potential. In a second application, this allows the distance between the first region 101 of the radiating antenna 10 and the external surface of the identification tag 2 to be increased. This second application allows radioelectric performance to be improved and therefore the communication performance of the radiofrequency transponder 1 placed in the identification tag 2. Specifically, the electrical insulation of the tag 2 is proportional to the distance between the first region 101 of the radiating antenna 10 and the external surface of the tag 2. The radioelectric operation of the radiofrequency transponder 1 is improved, or stays the same if this distance has reached its efficacy asymptote, by a better electrical insulation of the identification tag 2.

Figure 6:
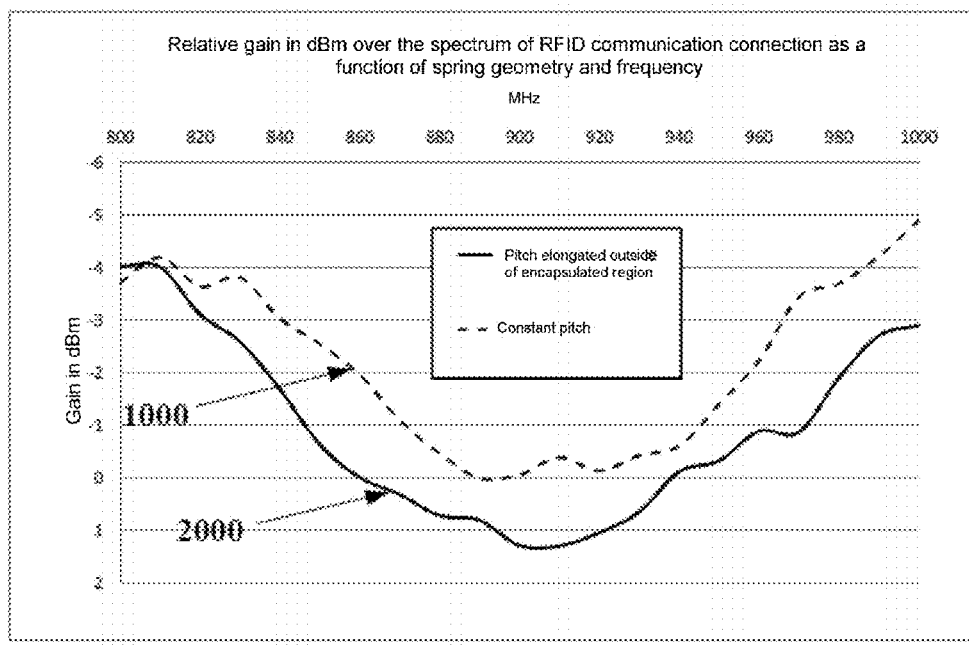
FIG. 6 shows a graph of the electrical power transmitted to two passive radiofrequency transponders incorporated into a tyre casing according to the invention, as a function of the observation frequency band.

FIG. 6 is a graph of the electrical power transmitted by passive radiofrequency transponders of the prior art and of the invention, each located inside a PiloSport4 Michelin tyre of 255/35ZR19 dimension to an external radiofrequency reader. The passive radiofrequency transponders are situated in the bead region, radially on the outside of the radially upper end of the bead wire at a distance of 30 millimetres and bearing radially against the fourth layer of elastomer compound. The communication frequency of the radiofrequency transponders is centred on 915 MHz. The measurement protocol employed corresponds to that of standard ISO/IEC 18046-3 entitled "Identification Electromagnetic Field Threshold and Frequency Peaks". Measurements were carried out at a wide range of scanned frequencies and not at a single frequency as conventionally is the case. The x-axis represents the frequency of the communication signal. The y-axis represents the electrical power received by the radiofrequency reader expressed in decibels relative to the maximum electrical power transmitted by a previous-generation radiofrequency transponder. The dashed curve 1000 represents the response of a radiofrequency transponder according to the cited document. The continuous curve 2000 represents the response of a transponder according to the invention to the same signal transmitted by the radiofrequency reader. An improvement of about two decibels in favour of the radiofrequency transponder according to the invention at the communication frequency of the radiofrequency reader will be noted. The improvement remains of the order of at least one decibel over a wide frequency band about the communication frequency.

The circumferential direction of the tyre, or longitudinal direction, is the direction that corresponds to the periphery of the tyre and is defined by the direction of running of the tyre casing.

The transverse or axial direction of the tyre is parallel to the axis of rotation, or reference axis, of the tyre casing.

The radial direction is a direction which crosses the axis of revolution, or reference axis, of the tyre casing and is perpendicular thereto.

The axis of rotation of the tyre casing is the axis about which it turns in normal use.

A radial or meridian plane is a plane that contains the axis of rotation of the tyre.

The circumferential median plane, or equatorial plane, is a plane that is perpendicular to the reference axis of the tyre casing and divides the latter into two halves.

Figure 7:
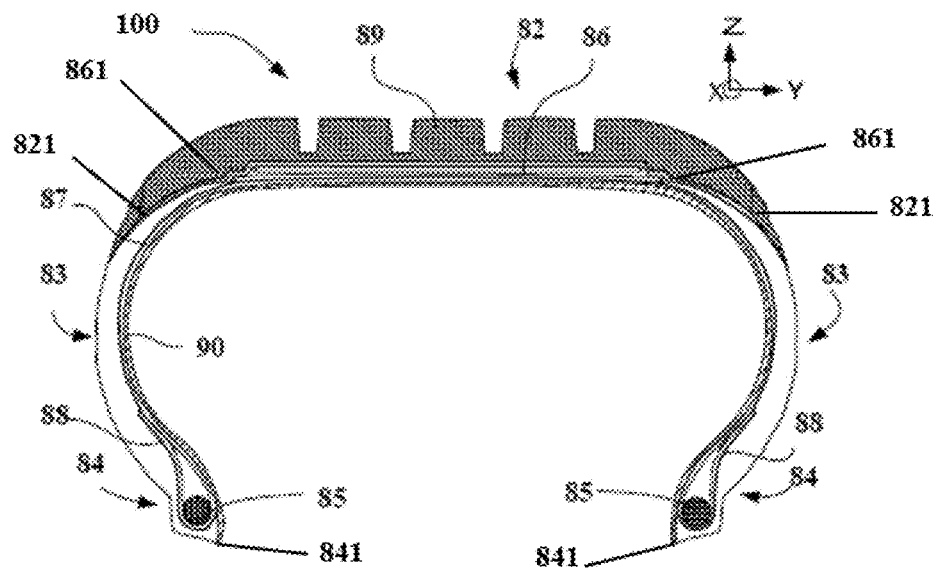
FIG. 7 shows a view in meridian section of a tyre casing of the prior art.

FIG. 7 shows a meridian section of a tyre casing 100 including a crown 82 reinforced by a crown reinforcement or belt 86, two sidewalls 83 and two beads 84. The crown 82 is delimited axially by two axial ends 821 providing the connection with each sidewall 83 of the tyre casing 100. The crown reinforcement 86 extends axially as far as an axial end 861 at each of its edges. The crown reinforcement 86 is surmounted radially on the outside by a tread 89 made of an elastomeric material. Each bead 84 is reinforced with a bead wire 85. A carcass reinforcement 87 anchored in the beads 84 separates the tyre casing into two regions, which will be called inner region in the direction of the fluid cavity and outer region towards the outside of the tyre. The carcass reinforcement comprises a main part 87 which is wound around the two bead wires 85 in each bead 84. The turn-up 88 of this main part 87 of the carcass reinforcement is arranged here towards the outside of the tyre casing 100. The carcass reinforcement is, in a manner known per se, made up of at least one layer reinforced with cords, for example in this instance textile cords, which is to say that these cords run practically parallel to one another. The main part 87 extends from one bead 84 to the other so as to form an angle of between 80° and 90° with the circumferential median plane EP. An airtight inner liner layer 90 extends from one bead 84 to the other radially internally with respect to the main part of the carcass reinforcement 87.

Figure 8:
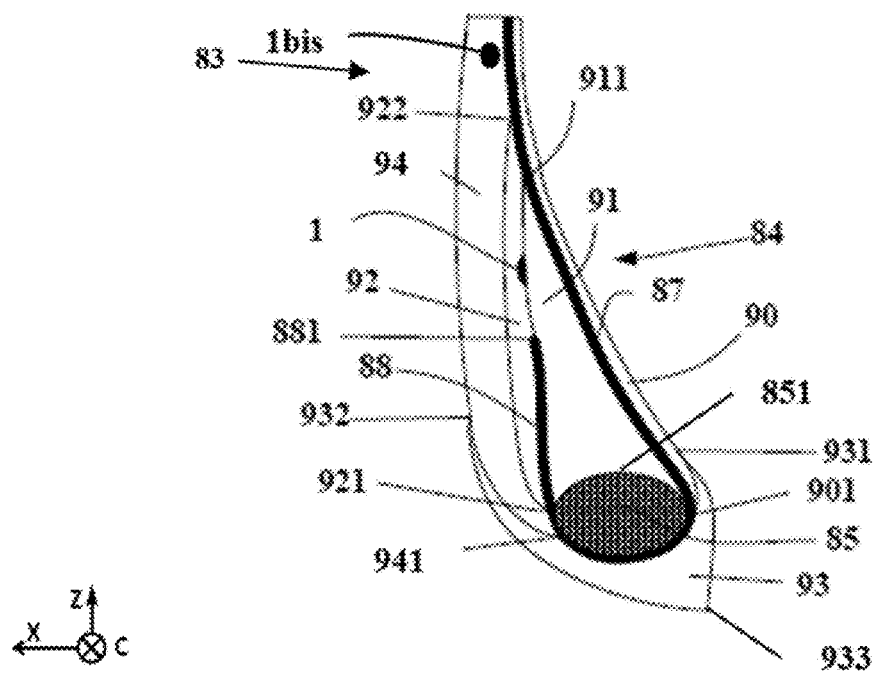
FIG. 8 is a view in meridian section of the bead and of the sidewall of a tyre casing according to the invention when the passive radiofrequency transponder is located in the outer region of the tyre casing.

FIG. 8 shows a detailed view of the tyre casing 100 in the region of the bead 84 and the sidewall 83. This figure illustrates the positioning of the passive radiofrequency transponder 1 in the exterior region of the tyre casing 100 with respect to the main part of the carcass reinforcement which, in the instance depicted, is made up of a single carcass layer 87.

The bead 84 consists of the bead wire 85, around which the main part of the carcass layer 87 is wound, with a turn-up portion 88 situated in the outer region of the tyre casing 100. The turn-up 88 of the carcass layer ends with a free edge 881. A fourth layer of rubber compound 91, called bead wire filler, is situated radially externally and adjacent to the bead wire 85. It has a radially outer free edge 911 bearing on a face of the main part of the carcass layer 87 (more precisely on the outer skim of the carcass layer; there is no direct contact between the cords of the carcass layer and the electronic unit). A second fourth layer of rubber compound 92, called "reinforcing filler", is adjacent thereto. It has two free edges. The first free edge 921 is situated radially internally and bears on the turn-up part 88 of the carcass layer. The other free edge 922 is situated radially externally and ends on the face of the main part of the carcass layer 87.

Finally, the sidewall 83 is defined by means of a third layer of elastomer compound 94 covering both the second fourth layer of elastomer compound 92 and the main part of the carcass layer 87. The sidewall defined by the external surface of the third layer of elastomer compound 94 which has a free edge 941 situated radially on the inside ends in the turned-up part 88 of the carcass layer.

The airtight inner liner 90, which is adjacent to the main part of the carcass layer 87 in this configuration, is located on the inner region of the tyre casing 100. It ends with a free edge 901 adjacent to the main part of the carcass layer 87. Finally, a second layer of elastomer compound 93, referred to as the bead protector, protects the carcass layer and the radially interior ends 901, 921 and 941 of the airtight inner liner 90, of the second fourth layer of elastomer compound 92 and of the third layer of elastomer compound 94 respectively. The outer face of this second layer of elastomer compound 93 is able to be in direct contact with the rim flange during mounting of the tyre casing 100 on the wheel. This second layer of elastomer compound 93 has three free ends forming a corner. The first free end 931 is situated in the inner region of the tyre casing 100. The second free end 932 is situated in the outer region of the tyre casing 100. Finally, the third free end 933 constitutes the interior end 841 of the bead 84.

A bead 84 and its connected sidewall 83 of this tyre casing 100 is equipped with passive radiofrequency transponders, numbered 1, possibly with suffixes, which are situated in the exterior region of the tyre casing 100. The first passive radiofrequency transponder 1, having been encapsulated beforehand in an electrically insulating encapsulating rubber, is positioned on the outer face of the fourth layer of the bead wire filler 91. It is positioned at a distance of 10 millimetres from the free edge 881 of the turned-up part 88 of the carcass layer that constitutes a mechanical singularity. This position ensures a region of mechanical stability for the radiofrequency transponder 1 that is beneficial to the mechanical endurance thereof. In addition, embedding it within the very structure of the tyre casing 100 gives it good protection against mechanical attacks coming from outside the tyre casing 100.

In general, it is preferable for the passive radiofrequency transponder to be positioned at a radial distance of between 20 to 40 millimetres from the radially outer end of the bead wire 85 in order to be in a region of the tyre casing that is mechanically stable during operation, as this ensures the physical integrity of the radiofrequency transponder. In addition, this positioning is guaranteed to be radially on the outside of the rim flange, allowing good radiocommunication performance by limiting the disturbances associated with the, often metallic, nature of the wheel.

The second radiofrequency transponder 1bis, having optionally been encapsulated in an electrically insulating encapsulating rubber compatible with or similar to the material of the third layer of elastomer compound 94, is positioned on the inside of the third layer of elastomer compound 94. The material similarity between the third layer of elastomer compound 94 and the encapsulating rubber ensures that the radiofrequency transponder 1bis is installed inside the sidewall 83 during the curing process. The radiofrequency transponder 1bis is simply placed within the material via a slit in the raw exterior face of the third layer of elastomer compound 94 during the building of the tyre casing 100. The pressurizing the green tyre body in the curing mould ensures that the radiofrequency transponder 1bis is, in the cured state, positioned as shown. This radiofrequency transponder 1bis is situated far from any free edge of any other constituent of the tyre casing 100 practically at the equator of the sidewall 83 providing the greatest radiofrequency communication distance. In particular, it is spaced from the free edge 932 of the bead protector, from the free edge 881 of the carcass layer turn-up 88 and from the free edges 911 and 922 of the filler rubbers. Its positioning ensures improved communication performance with an external radiofrequency reader, and especially with that specific shape for the radiating dipole antenna of the passive radiofrequency transponder. Cyclic stress loadings during running will not be disruptive due to the mechanical decoupling between the radiating antenna and the electronic portion of the passive radiofrequency transponder 1bis. Of necessity, these two transponders are situated axially on the outside of the end 933 of the second layer of rubber compound 93 and therefore of the radially inner end of the bead 84. They are positioned radially between the radially outer end 851 of the bead wire 85 with respect to the reference axis of the tyre casing 100, and the axial ends 861 of the crown reinforcement 86. The orientation of the passive radiofrequency transponder is circumferential in this instance, although the only stipulation it is that the radiating dipole antenna must rest on at least two reinforcing elements of the main part of the carcass reinforcing layer 87.

Figure 9:
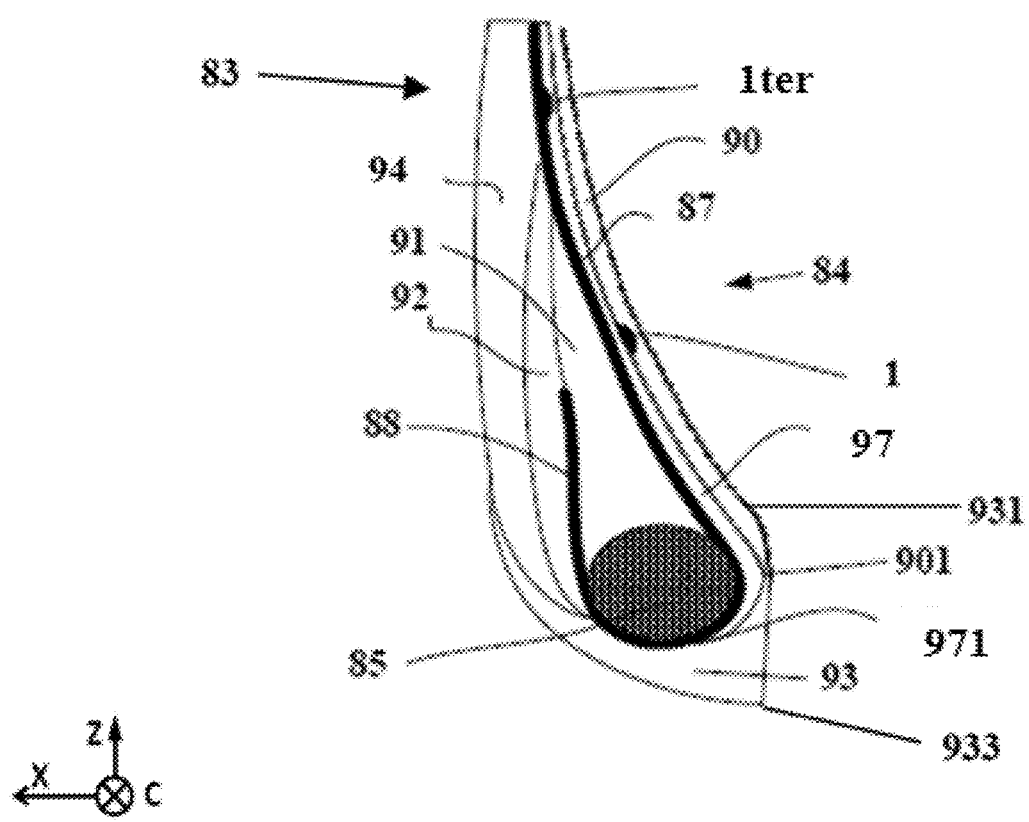
FIG. 9 is a view in meridian section of the bead and of the sidewall of a tyre casing according to the invention when the passive radiofrequency transponder is located in the inner region of the tyre casing.

FIG. 9 shows a detailed meridian section of a tyre casing 100 in the region of the bead 84 and of the sidewall 83. This FIG. 9 illustrates the position of the passive radiofrequency transponder in the inner region of the tyre casing 100 with respect to the main part of the carcass reinforcement 87.

The tyre casing 100 comprises, in particular at the inner region, an airtight inner liner 90 and a reinforcement reinforcing layer 97 interposed between the main part of the carcass layer 87 and the airtight inner liner 90. This component 97 has a radially interior free edge 971 located radially on the inside of the bead wire 85. This layer of reinforcers 97 extends from one bead 84 to the other bead 84 of the tyre casing 100.

The location of the radiofrequency transponder 1 at the interface between the airtight inner liner 90 and the layer of reinforcers 97 allows the radiofrequency transponder 1 to be mechanically stabilized. It is approximately 40 millimetres radially on the outside of the free edge 931 of the bead protector 93, which means it can be situated radially on the outside of the rim flange when the tyre casing mounted on a wheel is in operation. By contrast, in order to ensure suitable radiocommunication performance, it is preferable to use an encapsulating rubber that is electrically insulating for encapsulating the radiofrequency transponder 1. From a mechanical endurance point of view, this location is ideal for the passive radiofrequency transponder 1, which is protected from any external mechanical attack and from any internal thermomechanical attack. It can have any orientation provided that it rests on at least two reinforcing elements of the carcass reinforcing layer 87 and, as the component 97 is a reinforcing reinforcer layer, on several reinforcing elements of the reinforcer layer 97. This ensures the radiofrequency transponder 1 has an axial position, with respect to the thickness of the tyre casing 100, that allows robust tuning of the resonance of the radiating antenna of the passive radiofrequency transponder 1 when this transponder is incorporated in the tyre casing 100.

The second location of the radiofrequency transponder 1ter according to the invention allows improved radiocommunication performance by being radially further outwards in the tyre casing 100. However, it is advisable for it to be encapsulated in an electrically insulating rubber and for the first longitudinal axis of the radiating antenna to be positioned in such a way that the radiofrequency transponder 1*ter* rests on at least two reinforcing elements of the carcass layer 87. Here, in this example, the first longitudinal axis is placed circumferentially. It is preferable for the passive radiofrequency transponder 1*ter* to be positioned at the interface defined by at least two components of the tyre casing 100. That means that the data contained in the electronic chip of the passive radiofrequency transponder cannot be falsified when this chip has been write-protected after the first writing to the memory associated with the electronic chip.

Figure 10:
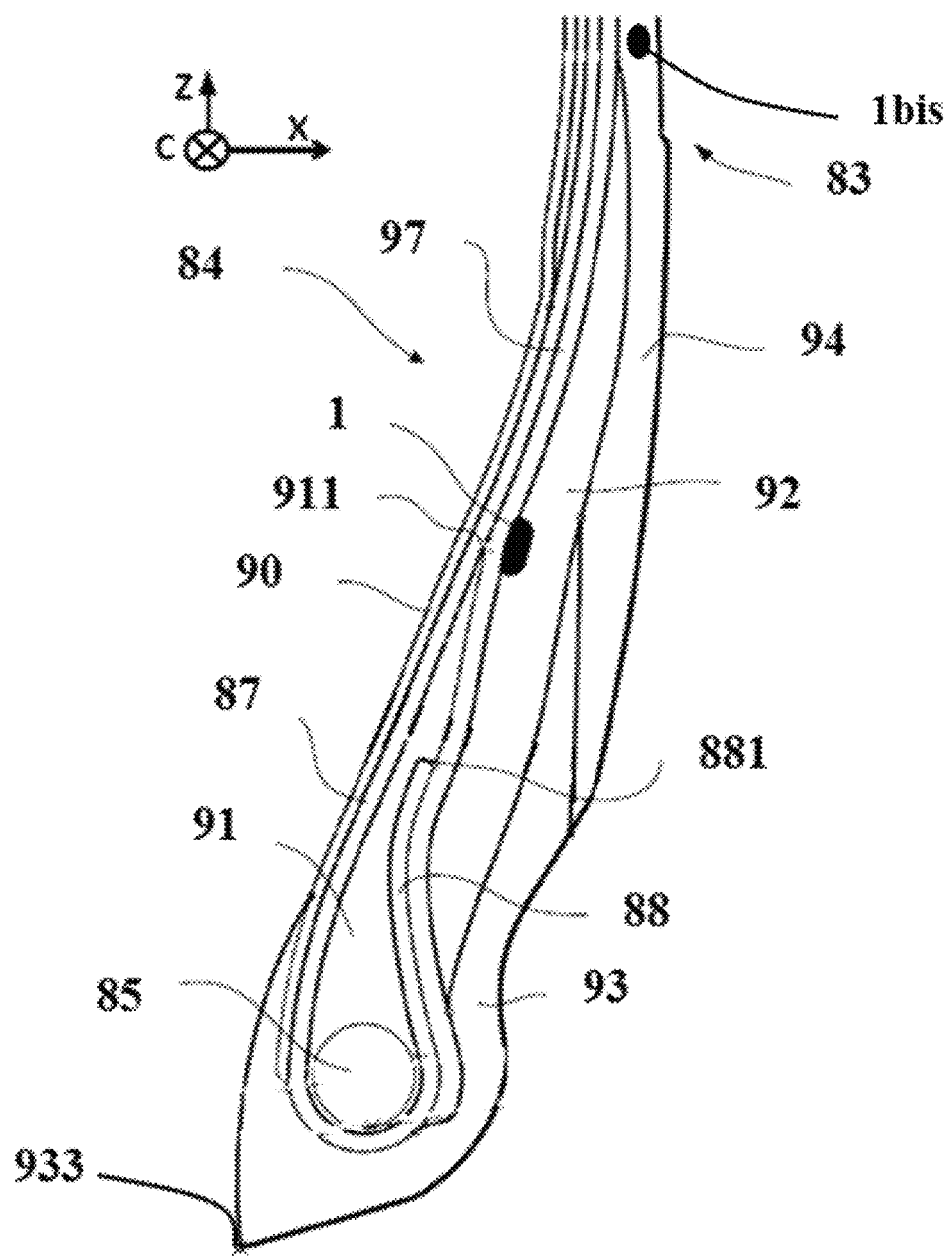
FIG. 10 is a view in meridian section of a tyre casing comprising two carcass reinforcement layers.

FIG. 10 shows a meridian section through a tyre casing 100. This tyre casing 100 usually comprises a crown, two sidewalls 83 and two beads 84. Only the radially inner part of a sidewall 83 and a bead 84 are depicted in FIG. 10. The bead 84 depicted in FIG. 10 comprises a bead wire 85 exhibiting symmetry of revolution, a main part of a first carcass layer 87 extending from the sidewall 83 towards the bead wire 85 extended by a turn-up 88 wound around the bead wire 85 and extending radially on the outside as far as an end 881. This turn-up 88 is positioned axially towards the outside of the bead 84 of the tyre casing 100. A fourth layer of elastomer compound 91, known as the filling rubber, is positioned radially on the outside relative to the bead wire 85 and axially between the main part 87 and the turn-up 88 of the first carcass layer. This filling rubber 91 extends radially on the outside as far as an end 911. It should be noted that the end 911 of the filling rubber is situated radially on the outside relative to the end 881 of the turn-up 88.

The bead 84 also comprises a second carcass layer or reinforcing layer 97 extending in the figure from the sidewall 83 as far as the bead wire 85. This second carcass layer 97 is positioned axially on the outside relative to the main part of the first carcass layer 87, to the filler 91 and to the turn-up 88 of the first carcass layer. The two carcass layers (87, 97) are, as is known per se, made up of plies reinforced by what are known as "radial" cords, for example here of textile, that is to say that these cords are disposed virtually parallel to one another and extend from one bead to the other so as to form with the median circumferential plane EP of the tyre casing an angle of between 80° and 90°. An airtight elastomer compound layer ("inner liner") 90, situated on the inside of the tyre casing, extends from one bead 84 to the other radially internally with respect to the main part of the first carcass layer 87. The bead 84 comprises a second layer of elastomer compound or protective rubber (or "protector" or "cushion gum") 93 able to make contact with the surface of a rim. This cushion gum 93 extends radially on the outside as far as an interface with a third layer of elastomer compound 94 of which the external surface defines the sidewall 83. The cushion gum 93 and the sidewall rubber 94 constitute the exterior layer of the tyre casing. The bead 84 also comprises a second fourth layer of elastomer compound or additional filling rubber 92 arranged axially between, on the one hand, the second carcass layer 97 and, on the other hand, the cushion gum 93 and sidewall rubber 94.

The bead 84 also comprises a passive radiofrequency transponder 1 positioned axially at the interface between the second carcass layer 97 and the additional filler 92 and radially between the end 911 of the filling rubber 91 and the end 881 of the turn-up 88 of the first carcass layer 87. Here, the radiofrequency transponder 1 is positioned radially on the outside with respect to the radially outer end of the bead wire 85 at a distance of 40 millimetres.

FIG. 10 also shows the positioning of a second passive radiofrequency transponder 1*bis* on the inside of the third layer of elastomer compound 94 situated near the equator of the tyre casing. This second position improves the communication performance of a radiofrequency transponder in operation on a vehicle because this position keeps the passive radiofrequency transponder away from the electrically conducting elements of the vehicle (wheel, wheel arch). In addition, the particular design of the radiating dipole antenna of this radiofrequency transponder optimizes radioelectric communications.

Figure 11:
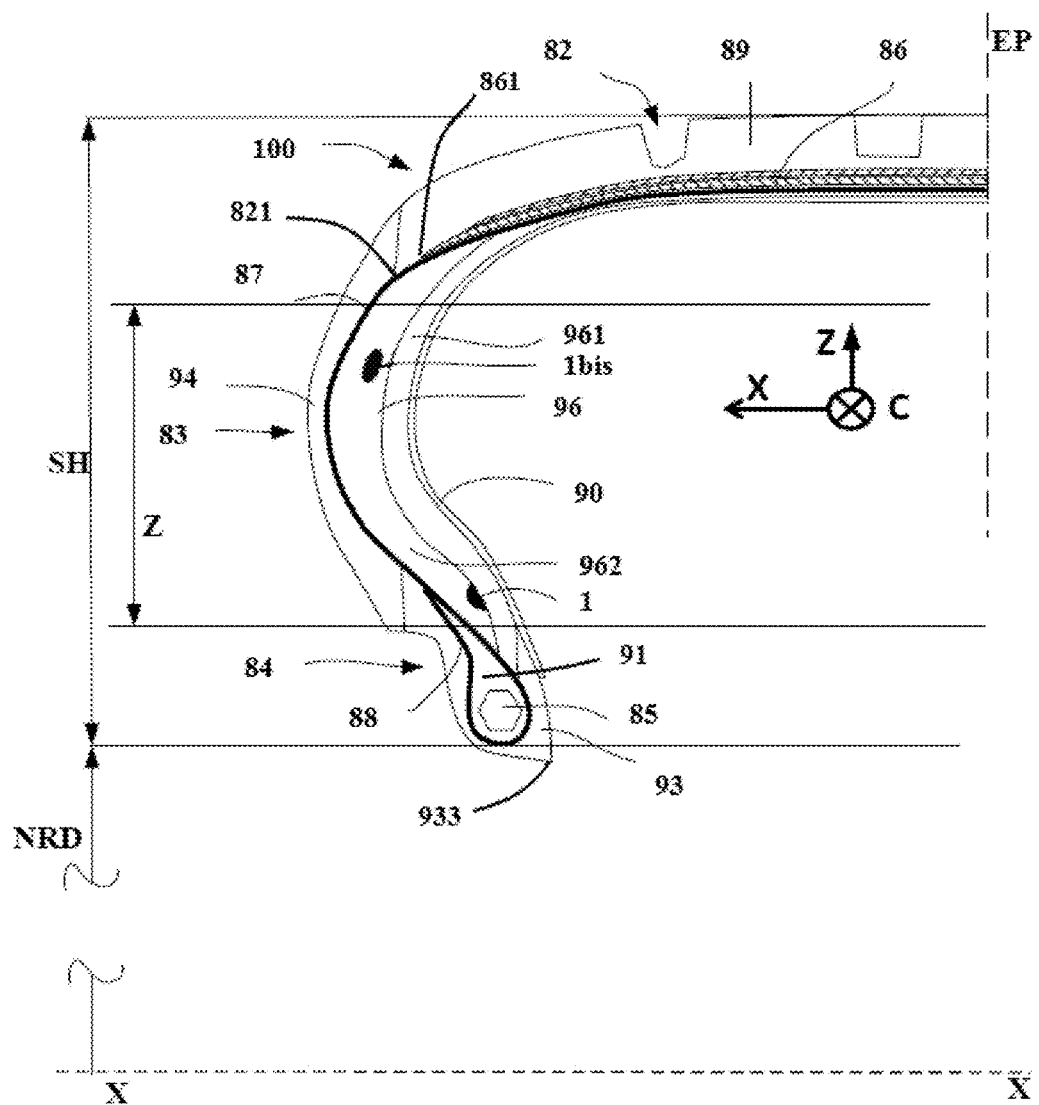
FIG. 11 is a view in meridian section of a tyre casing comprising a sidewall insert for extended running and equipped with a passive radiofrequency transponder.

FIG. 11 is a partial axial sectional illustration of a tyre 100 capable of running flat and fitted with a passive radiofrequency transponder according to the invention. This FIG. 11 also gives the section height SH of the tyre casing 100, i.e. the radial distance between the nominal diameter of the mounting rim of the tyre NRD and the radially outermost portion of the tread 89 of the tyre casing 100. In the context of this document, the nominal diameter of the mounting rim of the tyre is taken to be the diameter of the tyre casing as indicated by the tyre size.

The tyre casing 100 is shown in the unconstrained state, i.e. not mounted on a rim and such that the width between the two beads 84 amounts to the width of the nominal ETRTO rim.

As regards the axial direction, what is meant by "axially external" is an axial direction directed towards the exterior of the tyre and by "axially internal" what is meant is an axial direction directed towards the median plane EP of the tyre casing 100.

The tyre casing illustrated in FIG. 11 is a tyre that is capable of running flat, but it is chosen purely by way of illustration and the passive radiofrequency transponder described may be incorporated within and on the surface of any type of tyre.

The half of the tyre 100 capable of running flat has a crown 82, delimited by an axial end 821 at each of its edges, which is reinforced by a crown reinforcement or belt 86 delimited by an axial end 861 at each of its edges, a side wall 83 and a bead 84, the bead 84 being reinforced with the bead wire 85. The crown reinforcement 86 is surmounted radially on the outside by a tread 89 made of an elastomeric material. A carcass reinforcement made up of a single carcass layer 87 is wound around the bead wire 85 in the bead 84, the turn-up 88 of this carcass layer 87 being arranged axially towards the outside of the tyre casing 100. In a manner known per se, the carcass layer 87 is made up of at least one ply reinforced by what are known as "radial" cords, for example here of textile, that is to say that these cords are disposed virtually parallel to one another and extend from one bead to the other so as to form an angle of between 80° and 90° with the median circumferential plane EP. An airtight inner liner layer 90 extends from one bead to the other radially internally with respect to the carcass reinforcement 87. The bead 84 comprises a second layer of elastomer compound (or "protector") 93 able to be in contact with the surface of a rim and ending with the end 933 that represents the radially interior end 841 of the bead 84. It also comprises a fourth layer of elastomer compound 91 extending radially externally relative to the bead wire 85.

The tyre 100 is able to run flat because of the presence of a sidewall insert 96 placed axially internally relative to the main part of the carcass reinforcement 87. This sidewall insert 96 allows the structure of the tyre to withstand the load at zero pressure. The order of magnitude of the extension modulus of a rubber for a sidewall insert is about twice the value of the modulus of a sidewall rubber or more.

The sidewall insert 96 of FIG. 11 comprises a first passive radiofrequency transponder 1 arranged at a radial distance D1 from the radially interior end 933 of the bead 84. The distance D1 must be larger than D0 equal to 20 mm in order not to penalize the quality of communication between the passive radiofrequency transponder 1 and an external reader. This distance is greater than the height of a typical rim flange, which is 17.5 mm. As a preference, the distance D1 is less than 50 millimetres.

The first passive radiofrequency transponder 1 is preferably placed within the semi-finished sidewall insert 96 before its incorporation within the green tyre casing 100.

In the example of FIG. 11, the sidewall insert 96 is made up of two rubber masses 961 and 962 which are axially adjacent to one another. The first passive radiofrequency transponder 1 is positioned at the interface between the two rubber masses 961 and 962.

This embodiment facilitates the precise and reproducible placement of the passive radiofrequency transponder 1 during the building of the tyre casing 100.

A second passive radiofrequency transponder 1bis is placed inside the rubber mass 962 via a slit on one of the surfaces of the rubber mass 962 that allows the passive radiofrequency transponder 1bis to be inserted into the rubber mass 962. This second embodiment makes the passive radiofrequency transponder easier to position with respect to the main part of the carcass reinforcing layer 87 as it is in contact with the rubber mass and makes the dielectric environment in the vicinity of the passive radiofrequency transponder 1bis more uniform, thereby improving the radiofrequency performance of said transponder. In addition, it is situated radially further out from the reference axis of revolution of the tyre casing 100.

FIG. 11 illustrates the region Z of the section height SH of the tyre casing 100 in which region it is preferable for the passive radiofrequency transponders 1 and 1bis to be positioned. This region Z runs from 20 to 70% of SH. The passive radiofrequency transponder 1 is placed at around 25% of SH, and the passive radiofrequency transponder 1bis at around 60% of this parameter.

Figure 12:
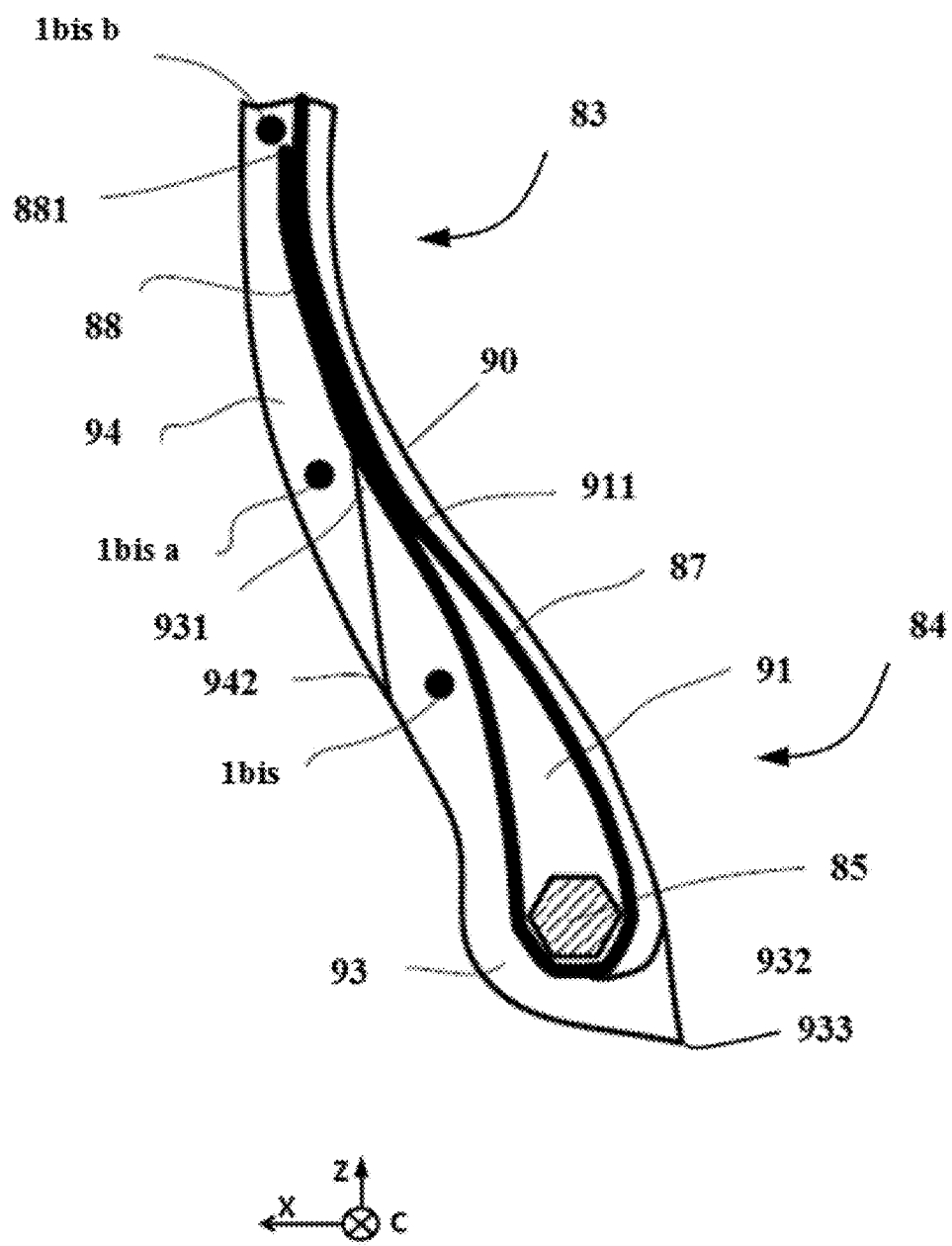
FIG. 12 is a view in meridian section of the bead and of the sidewall of a tyre casing according to the invention when the passive radiofrequency transponder is located in the inner region of the tyre casing.

FIG. 12 is an axial section of a tyre casing 100 in the region of the bead 84 and of the sidewall 83. The tyre casing comprises a crown block ending in a bead 84 at each of its axial edges by way of a sidewall 83.

FIG. 12 shows a bead 84 and a sidewall 83 of a tyre, chiefly for passenger vehicles. The carcass reinforcement, made up of a single carcass layer in FIG. 12, is anchored in the bead 84 by being turned up around the bead wire 85 in order to create a main part 87 and a turn-up 88 of the carcass reinforcement. The reinforcing threads in the carcass layer are textile threads. The fourth layer of elastomer compound 91 separates the main part of the carcass reinforcement 87 from the turn-up 88. The turn-up 88 of the carcass reinforcement extends radially outwards in the region of the sidewall 83 beyond the radially exterior end 911 of the fourth layer of elastomer compound 91.

The second layer of elastomer compound 93, the layer that is in contact with the rim when the tyre casing is mounted thereon, and the third layer of elastomer compound 94 that forms the exterior surface of the tyre in the region of the sidewall 83, are in direct contact with the turn-up 88. There is no other fourth layer of elastomer compound. This bead 84 comprises a first passive radiofrequency transponder 1bis embedded in the second layer of elastomer compound 93 at a position that is radially exterior in relation to the bead wire 85, in a range spanning between 20 and 40 millimetres so as to be radially on the outside of the flange of the rim J once the tyre has been mounted, so as to ensure good communication between the radiofrequency transponder and an external reader.

This FIG. 12 also shows two alternative positions 1bis a and 1bis b in which the passive radiofrequency transponder is embedded in the third layer of elastomer compound 94. As before, these last two positions are rendered possible on account of the good mechanical strength of the passive radiofrequency transponder of the invention. All these positions are inside the tyre casing, axially on the outside of the end 933 of the second layer of elastomer compound which constitutes the interior end 841 of the bead 84.

It is also possible to position the radiofrequency transponders at the interface between the second layer of elastomer compound 93 and the turn-up 88 or the third layer of elastomer compound 94 and the turn-up 88 or the main part 87 of the carcass reinforcement. It is then advisable to encapsulate the passive radiofrequency transponders in an encapsulating mass and to keep the transponders at least 5 or even 10 millimetres away from the ends 931 of the layers of elastomer compound 93 and 94 and from the end 881 of the turn-up 88 in order to preserve the physical integrity of the tyre casing.

Of course, the orientation of the radiating dipole antenna of the passive radiofrequency transponder with respect to the direction defined by the reinforcing elements of the main part of the carcass reinforcement can be any, provided that the projection of the radiating dipole antenna intercepts at least two reinforcing elements. As a result, what is meant by the distance between the end of a layer and the passive radiofrequency transponder is the distance of each material point of the passive radiofrequency transponder in each meridian plane of the tyre casing with respect to the end of the layer in that same meridian plane. What is meant by a passive radiofrequency transponder is that this transponder is potentially equipped with an encapsulating mass. However, it is more practical to position the passive radiofrequency transponder directly so that the first longitudinal axis is substantially perpendicular to the direction of the reinforcing elements of the main part of the carcass reinforcing layer.

The invention claimed is:

1. A tire casing (100) that is toroidal in shape about a reference axis and equipped with a passive radiofrequency transponder (1, 1bis, 1ter) and comprises:
   a crown block (82) comprising a crown reinforcement (86) having an axial end (861) at each of its edges, and a tread (89), connected at each of its axial ends (821) to a bead (84) having an interior end (841) situated axially and radially on an inside of the bead (84) with respect to the reference axis, by a sidewall (83);
   a carcass reinforcement comprising at least one carcass reinforcement layer formed of mutually parallel reinforcing elements inserted between two skim layers of elastomer compound, the at least one carcass reinforcing layer being anchored in each of the beads (84) by being turned up around an annular bead wire (85) to form a main part of the at least one carcass reinforcement layer (87), extending from one bead wire (85) to the other and situated radially on an inside with respect to the crown block (82), and a turn-up of the at least one carcass reinforcement layer (88) in each of the beads (84);
   a second layer of elastomer compound (93) forming an exterior surface of the tire casing (100) in a region of the bead (84), the second layer of elastomer compound (93) being intended to come into contact with a rim;

a third layer of elastomer compound (94) situated radially on an outside in contact with the second layer of elastomer compound (93) forming an exterior surface of the sidewall (83);

the passive radiofrequency transponder (1, 1bis, 1ter) comprising an electronic portion (20) and a radiating dipole antenna (10) consisting of a single-strand helicoidal spring defining a helix pitch P, a winding diameter D, a midplane (19) and a wire diameter defining an interior diameter (13) and an exterior diameter (15) of the radiating antenna (10), of which a length (L0) is designed to communicate on a frequency band with an external radiofrequency reader defining a first longitudinal axis (11), a central region and two lateral regions along the first longitudinal axis (11), the electronic portion (20) comprising an electronic chip and a primary antenna of coil type comprising at least one turn, and defining a second longitudinal axis and a midplane (21) perpendicular to the second longitudinal axis, the primary antenna being electrically connected to the electronic chip and electromagnetically coupled to the radiating dipole antenna (10), the primary antenna being circumscribed inside a cylinder of which an axis of revolution is parallel to the second longitudinal axis and in which the diameter is greater than or equal to one third of the interior diameter (13) of the radiating antenna (10) situated plumb with the primary antenna, and the passive radiofrequency transponder (1, 1bis, 1ter) being arranged in such a way that the first (11) and second longitudinal axes are parallel and that the midplane of the primary antenna (21) is positioned in the central region of the helical spring (10), wherein, with the radiating dipole antenna (10) comprising a second region (102) in which the radiating dipole antenna (10) is situated plumb with the electronic portion (20) and a first region (101, 101a, 101b) in which the radiating dipole antenna (10) is not situated plumb with the electronic portion (20), a ratio between a helix pitch (P1) and a winding diameter (D1) for at least one loop of the helical spring in the first region (101, 101a, 101b) is greater than 0.8, wherein the ratio between the helix pitch (P1) and the winding diameter (D1) of each loop of the helical spring in the first region (101, 101a, 101b) of the radiating dipole antenna (10) is less than 3, wherein the radiating dipole antenna (10) is situated plumb with at least two reinforcement elements of the main part of the at least one carcass reinforcement layer (87), and wherein the passive radiofrequency transponder is situated axially on an outside of the interior end (841) of the bead (84) and radially between the radially outermost end (851) of the bead wire (85) and the axial end (861) of the crown reinforcement (86).

2. The tire casing (100) according to claim 1, wherein the tire casing (100) comprises at least a fourth layer of elastomer compound (92) situated axially on an outside of the main part of the at least one carcass reinforcement layer (87) and axially on an inside of the second (93) and/or third (94) layer of elastomer compound.

3. The tire casing (100) according to claim 1, wherein, with the tire casing (100) comprising at least one airtight layer of elastomer compound (90) situated furthest toward an inside of the tire casing (100), the tire casing (100) comprises at least a fifth layer of elastomer compound (96) axially on an inside of the main part of the at least one carcass reinforcement layer (87).

4. The tire casing (100) according to claim 1, wherein the tire casing (100) comprises at least one reinforcement layer of reinforcers (97) which is formed of reinforcing elements inserted between two skim layers of rubber compound.

5. The tire casing (100) according to claim 1, wherein the passive radiofrequency transponder (1, 1bis, 1ter) is partially encapsulated in a mass of electrically insulating elastomer compound (3a, 3b).

6. The tire casing (100) according to claim 5, wherein a tensile elastic modulus of the encapsulating mass (3a, 3b) is lower than a tensile elastic modulus of at least one elastomer compound adjacent to the encasing mass (3a, 3b).

7. The tire casing (100) according to claim 5, wherein a relative dielectric constant of the encapsulating mass (3a, 3b) is lower than 10.

8. The tire casing (100) according to claim 1, wherein the passive radiofrequency transponder (1, 1ter) is situated at an interface defined by at least a surface of a layer of elastomer compound (91, 92, 93, 94, 96) of the tire casing (100).

9. The tire casing (100) according to claim 8, wherein, with the interface being defined by another layer of elastomer compound (91, 92, 93, 94, 96) or a reinforcement layer (97), the passive radiofrequency transponder (1, 1ter) is situated at a distance of at least 5 millimeters from the ends of the layers (91, 92, 93, 94, 96, 97) at the interface.

10. The tire casing (100) according to claim 1, wherein the passive radiofrequency transponder (1bis) is situated on an inside of a layer of elastomer compound (91, 92, 93, 94, 96) of the tire casing (100).

11. The tire casing (100) according to claim 10, wherein the first longitudinal axis (11) of the radiating antenna (10) of the passive radiofrequency transponder (1bis) is perpendicular to a thickness of the layer of elastomer compound (91, 92, 93, 94, 96).

12. The tire casing (100) according to claim 10, wherein the passive radiofrequency transponder (1bis) is situated at a distance of at least 0.3 millimeters from the surfaces of the layer of elastomer compound (91, 92, 93, 94, 96).

13. The tire casing (100) according to claim 1, wherein a ratio between a helix pitch (P2) and a winding diameter (D2) for each loop of the second region (102) is less than or equal to 0.8.

14. The tire casing (100) according to claim 1, wherein the helix pitch (P1) of the radiating dipole antenna (10), which corresponds to the helix pitch of the radiating dipole antenna (10) in the first region (101, 101a, 101b), is greater than a helix pitch (P2) of the radiating dipole antenna (10), which corresponds to the helix pitch of the radiating dipole antenna (10) in the second region (102) in which the radiating dipole antenna (10) is situated plumb with the electronic portion (20).

15. The tire casing (100) according to claim 1, wherein, with the electronic portion (20) being placed inside the radiating dipole antenna (10), a first inside diameter D1' of the radiating dipole antenna (10) in the first region (101, 101a, 101b) is smaller than a second inside diameter D2' of the radiating dipole antenna (10) in a second region (102), and the electronic portion (20) is circumscribed by a cylinder of which an axis of revolution is parallel to the first longitudinal axis (11) and of which the diameter is larger than or equal to the first inside diameter D1' of the radiating dipole antenna (10).

* * * * *